(12) United States Patent
Peng et al.

(10) Patent No.: US 12,507,196 B2
(45) Date of Patent: Dec. 23, 2025

(54) VIRTUAL MULTI-ANTENNA FOR ENHANCED RF-BASED PNT

(71) Applicant: QUALCOMM Incorporated, San Diego, CA (US)

(72) Inventors: Yuxiang Peng, Sunnyvale, CA (US); Ning Luo, Cupertino, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 18/168,484

(22) Filed: Feb. 13, 2023

(65) Prior Publication Data
US 2024/0276439 A1 Aug. 15, 2024

(51) Int. Cl.
*H04W 64/00* (2009.01)
*G01S 19/31* (2010.01)

(52) U.S. Cl.
CPC .......... *H04W 64/003* (2013.01); *G01S 19/31* (2013.01)

(58) Field of Classification Search
CPC ... G01S 19/31; G01S 3/14; G01S 3/74; G01S 5/0036; G01S 5/04; G01S 5/0249; G01S 19/215; G01S 19/396; G01S 19/52; G01S 17/931; G01S 17/42; G01S 2013/9316; G01S 17/89; G01S 17/86; G01S 5/16; G01S 5/0018; G01S 17/66; G01S 5/12; G01S 7/4817; G01S 7/497; G01S 2013/9325; G01S 5/0027; G01S 5/0054; G01S 5/0242; G01S 5/0289; G01S 7/4808; G01S 13/42; G01S 13/46; G01S 13/865; G01S 13/87; G01S 17/58; G01S 19/40; G01S 5/08; G01S 7/403; G01S 7/4868; G01S 1/24;

(Continued)

(56) References Cited

U.S. PATENT DOCUMENTS

2008/0100502 A1* 5/2008 Jantunen .............. G01S 3/74
  342/146
2009/0243933 A1* 10/2009 Shirakawa ............ G01S 3/74
  342/417

(Continued)

FOREIGN PATENT DOCUMENTS

WO   2022085003 A1   4/2022

OTHER PUBLICATIONS

International Search Report and Written Opinion—PCT/US2024/014083—ISA/EPO—Jun. 5, 2024.

*Primary Examiner* — Nimesh Patel
(74) *Attorney, Agent, or Firm* — QUALCOMM Incorporated

(57) ABSTRACT

A method of wireless communication at a UE is disclosed herein. The UE obtains, via an antenna of the UE, a first indication of a first measurement of at least one RF signal at a first time instance. The UE obtains, via the antenna, a second indication of a second measurement of the at least one RF signal at a second time instance. The UE calculates a distance traveled by the UE between the first time instance and the second time instance. The UE calculates a DOA of the at least one RF signal based on the first measurement, the second measurement, and the distance traveled by the UE between the first time instance and the second time instance. The UE outputs a third indication of the calculated DoA of the at least one RF signal.

30 Claims, 16 Drawing Sheets

(58) Field of Classification Search
CPC .......... G01S 11/02; G01S 11/10; G01S 13/58;
G01S 13/589; G01S 13/588; G01S
13/862; G01S 13/92; G01S 15/08; G01S
17/06; G01S 17/04; G01S 2013/462;
G01S 19/53; G01S 2013/464; G01S
5/0284; H04B 17/254; H04B 17/27;
H04W 4/027; H04W 4/029; H04W 4/80;
H04W 4/40; H04W 4/025; H04W 64/00;
H04W 64/003; H04W 28/0268; H04W
52/225; H04W 52/282; H04W 52/283;
H04W 92/18; H04W 24/10; H04W 4/38;
H04W 4/023; H04W 4/02
See application file for complete search history.

(56) References Cited

U.S. PATENT DOCUMENTS

| | | | | |
|---|---|---|---|---|
| 2016/0135007 | A1* | 5/2016 | Persson | H04W 4/023 |
| | | | | 455/456.2 |
| 2020/0103486 | A1* | 4/2020 | Knaappila | H04R 3/12 |
| 2020/0212990 | A1* | 7/2020 | Kurras | G01S 5/10 |
| 2021/0333410 | A1* | 10/2021 | Gum | G01S 19/48 |
| 2021/0385623 | A1* | 12/2021 | Wang | H04W 4/029 |
| 2022/0353697 | A1* | 11/2022 | Saha | H04W 64/006 |
| 2023/0261767 | A1* | 8/2023 | Maor | G01S 5/04 |

\* cited by examiner

VIRTUAL MULTI-ANTENNA FOR ENHANCED RF-BASED PNT

TECHNICAL FIELD

The present disclosure relates generally to communication systems, and more particularly, to positioning, navigation, and timing (PNT).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and at least one processor coupled to the memory and, based at least in part on information stored in the memory, the at least one processor is configured to obtain, via an antenna of a user equipment (UE), a first indication of a first measurement of at least one radio frequency (RF) signal at a first time instance; obtain, via the antenna, a second indication of a second measurement of the at least one RF signal at a second time instance; calculate a distance traveled by the UE between the first time instance and the second time instance; calculate a direction of arrival (DoA) of the at least one RF signal based on the first measurement, the second measurement, and the distance traveled by the UE between the first time instance and the second time instance; and output a third indication of the calculated DoA of the at least one RF signal.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
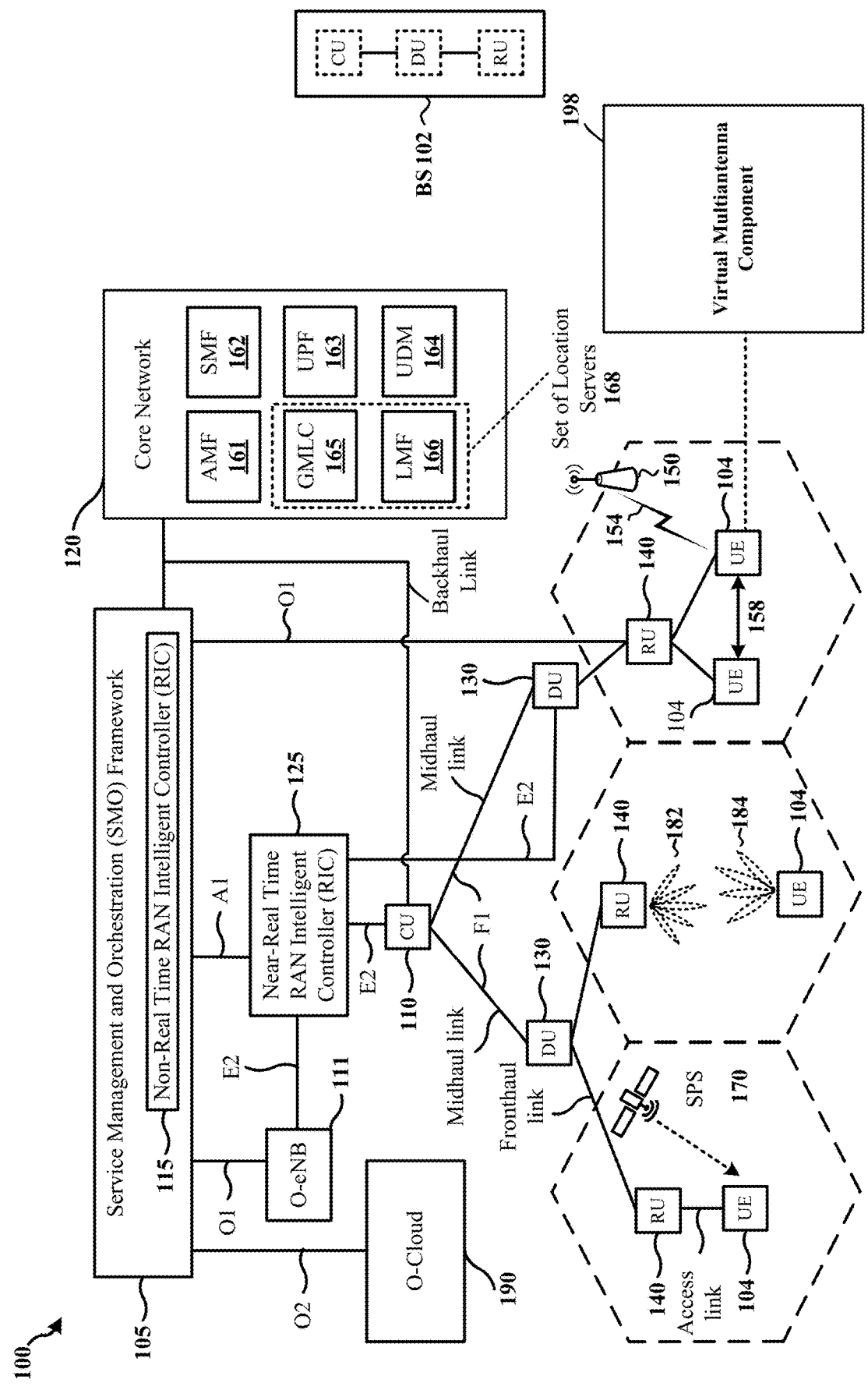
FIG. 1 is a diagram illustrating an example of a wireless communications system and an access network.

A wireless communication device equipped with multiple antennas may utilize the multiple antennas in order to determine a direction of arrival (DoA) of a signal. The DoA may then be utilized to improve global navigation satellite system (GNSS) positioning, navigation, and timing (PNT) performance. For instance, the DoA may be utilized to remove multipath and non-line-of-sight (NLOS) signals and/or the DoA may be utilized for anti-spoofing purposes to mitigate signals from unexpected directions. However, some wireless communication devices may not be equipped with multiple antennas.

Various technologies pertaining to a virtual multi-antenna for enhanced RF-based PNT are described herein. In an example, a UE obtains, via an antenna of the UE, a first indication of a first measurement of at least one RF signal at a first time instance. The UE obtains, via the antenna, a second indication of a second measurement of the at least one RF signal at a second time instance. The UE calculates a distance traveled by the UE between the first time instance and the second time instance. The UE calculates a DoA of the at least one RF signal based on the first measurement, the second measurement, and the distance traveled by the UE between the first time instance and the second time instance. The UE outputs a third indication of the calculated DoA of the at least one RF signal.

Particular aspects of the subject matter described in this disclosure can be implemented to realize one or more of the following potential advantages. In some examples, by calculating the DoA of the at least one RF signal using the antenna (e.g., a single omni-directional antenna), the UE may emulate functionality associated with multiple antennas. For instance, the UE may utilize the DoA (calculated based on measurements performed via the antenna) in order to remove multipath and NLOS signals and/or utilize the DoA for anti-spoofing purposes to mitigate signals from unexpected directions without being equipped with multiple antennas.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a virtual multiantenna component 198 that may be configured to obtain, via an antenna of the UE, a first indication of a first measurement of at least one radio frequency (RF) signal at a first time instance; obtain, via the antenna, a second indication of a second measurement of the at least one RF signal at a second time instance; calculate a distance traveled by the UE between the first time instance and the second time instance; calculate a direction of arrival (DoA) of the at least one RF signal based on the first measurement, the second measurement, and the distance traveled by the UE between the first time instance and the second time instance; and output a third indication of the calculated DoA of the at least one RF signal. Although the following description may be based on 5G NR, the concepts described herein may be applicable to other types of wireless communication systems as well.

Figure 2:
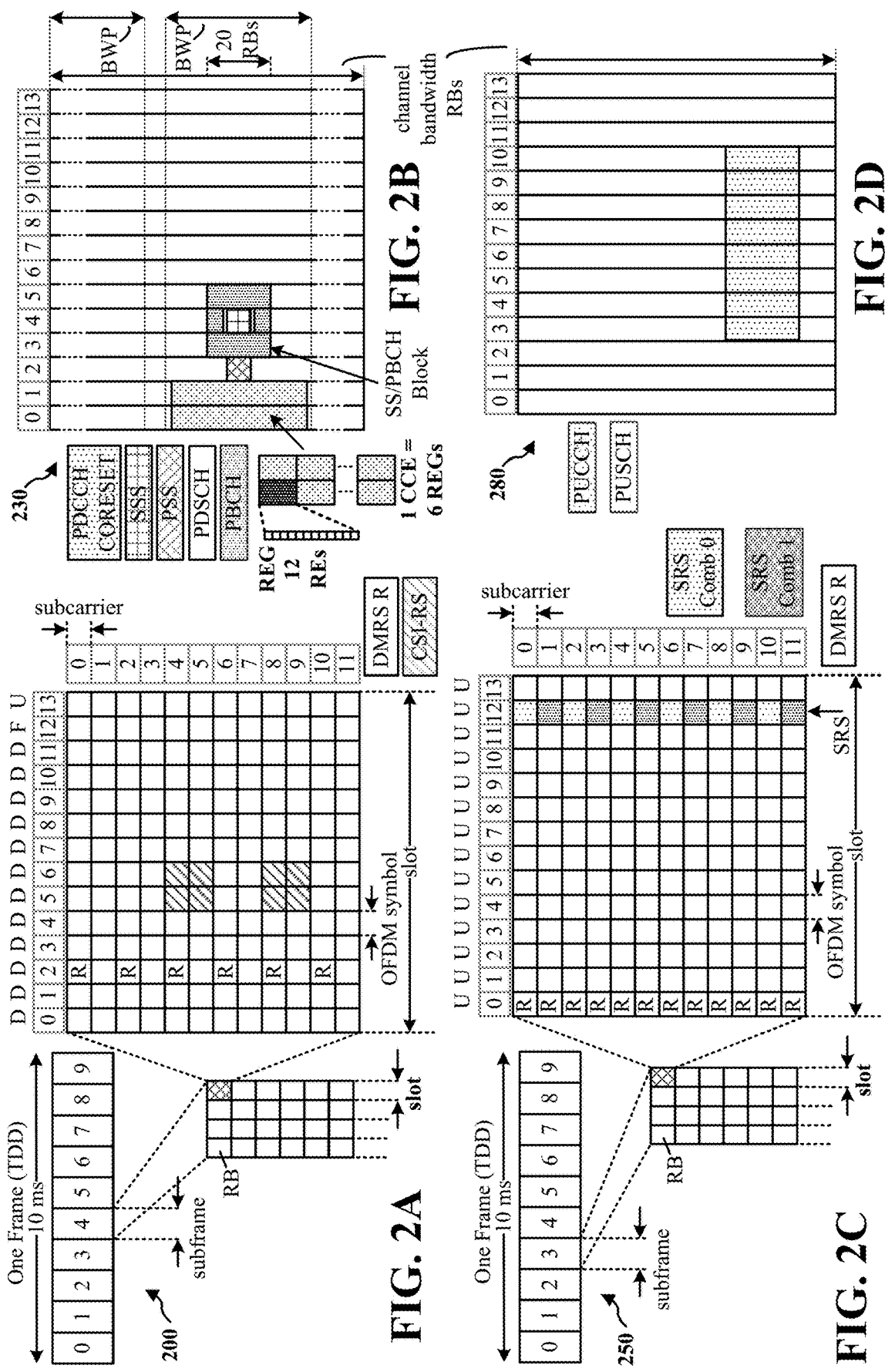
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
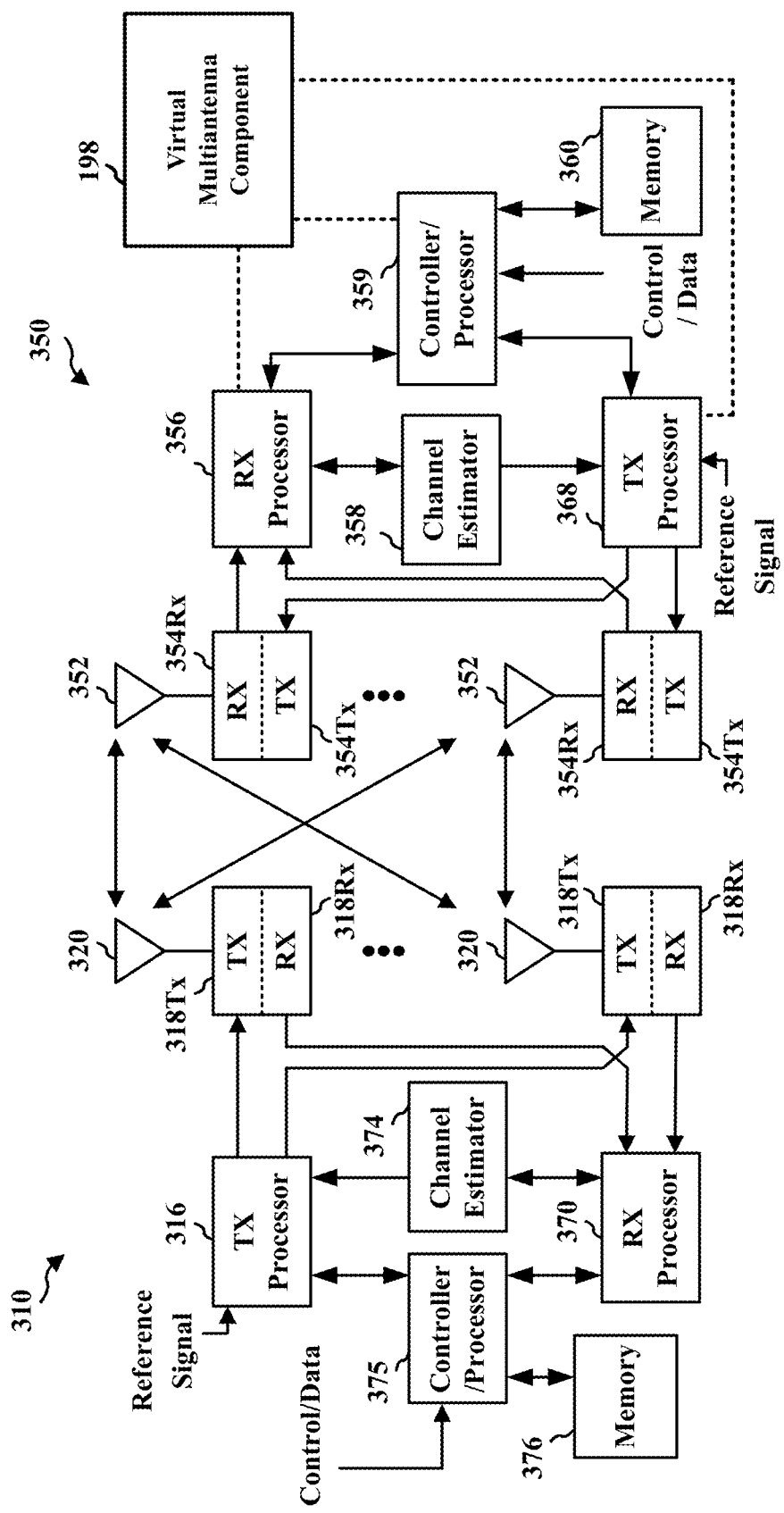
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the virtual multiantenna component 198 of FIG. 1.

Figure 4:
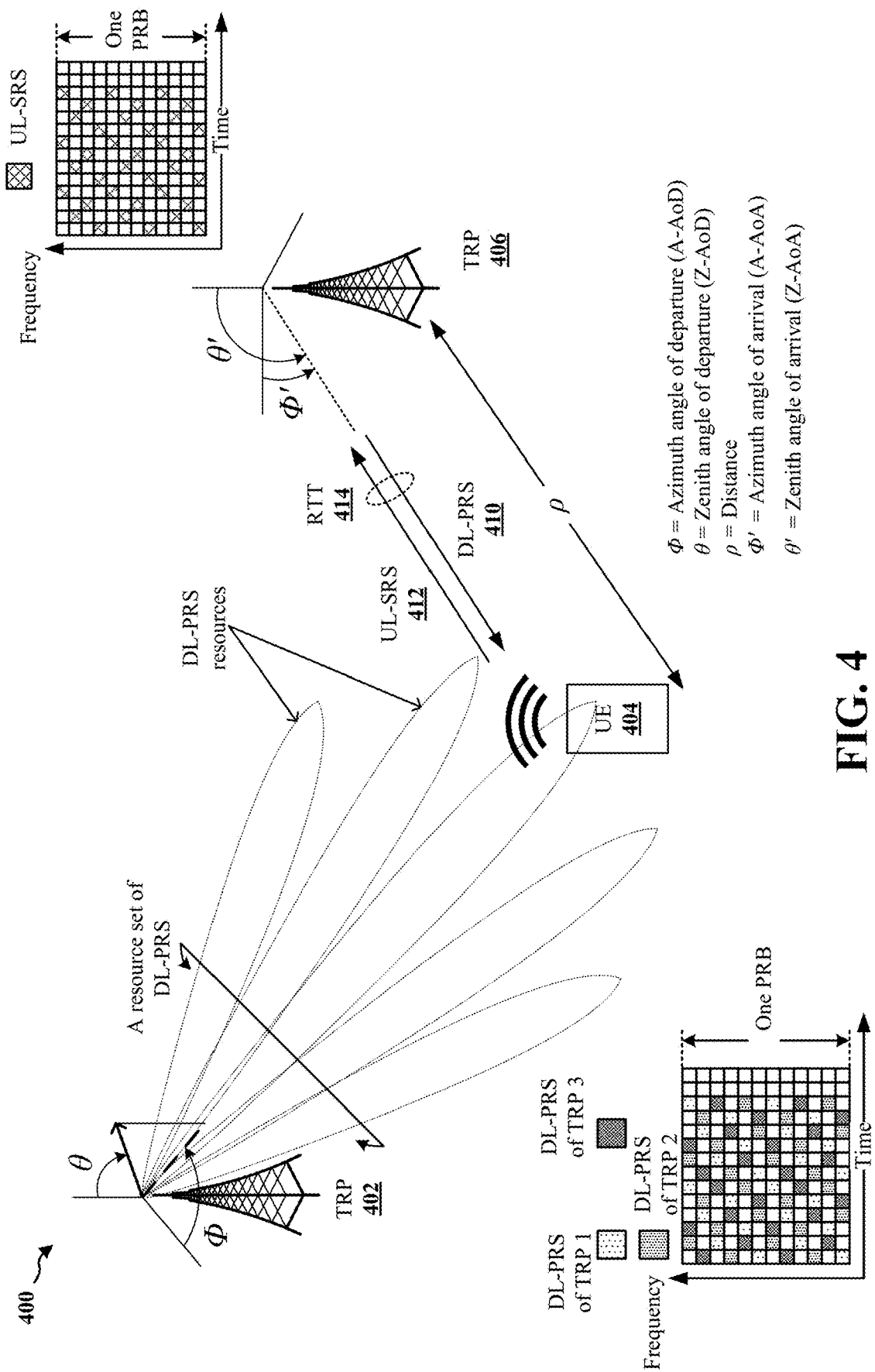
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{PRS\_RX}$ and transmit the DL-PRS 410 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $|T_{SRS\_RX}-T_{PRS\_TX}|-|T_{SRS\_TX}-T_{PRS\_RX}|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
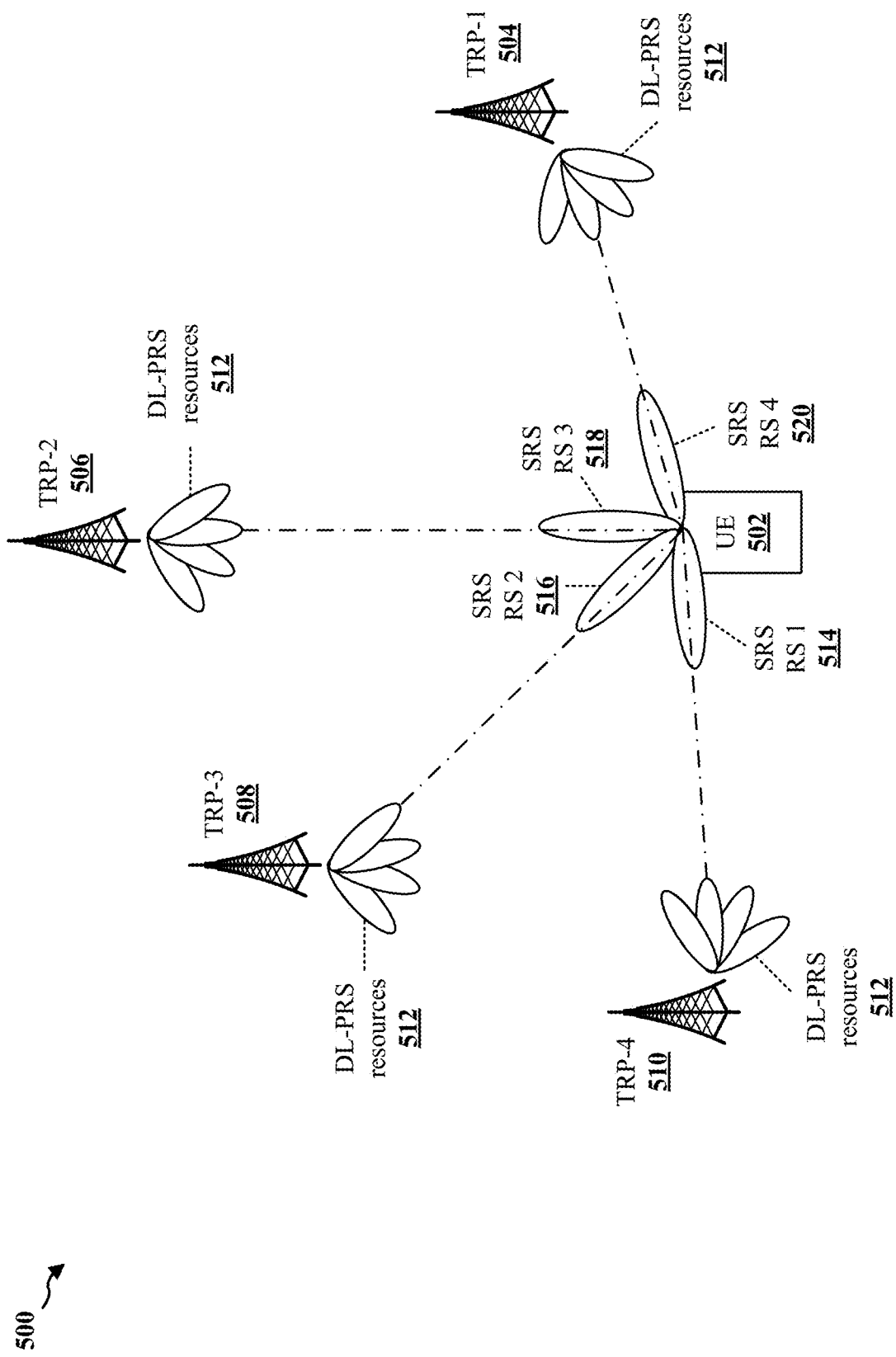
FIG. 5 is a diagram illustrating an example of a wireless communication system.

FIG. 5 is a diagram 500 illustrating an example of estimating a position of a UE based on multi-RTT measurements from multiple TRPs in accordance with various aspects of the present disclosure. A UE 502 may be configured by a serving base station to decode DL-PRS resources 512 that correspond to and are transmitted from a first TRP 504 (TRP-1), a second TRP 506 (TRP-2), a third TRP 508 (TRP-3), and a fourth TRP 510 (TRP-4). The UE 502 may also be configured to transmit UL-SRSs on a set of UL-SRS resources, which may include a first SRS resource 514, a second SRS resource 516, a third SRS resource 518, and a fourth SRS resource 520, such that the serving cell(s), e.g., the first TRP 504, the second TRP 506, the third TRP 508, and the fourth TRP 510, and as well as other neighbor cell(s), may be able to measure the set of the UL-SRS resources transmitted from the UE 502. For multi-RTT measurements based on DL-PRS and UL-SRS, as there may be an association between a measurement of a UE for the DL-PRS and a measurement of a TRP for the UL-SRS, the smaller the gap is between the DL-PRS measurement of the UE and the UL-SRS transmission of the UE, the better the accuracy may be for estimating the position of the UE and/or the distance of the UE with respect to each TRP.

In some aspects of wireless communication, the terms "positioning reference signal" and "PRS" may generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. In some aspects, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 6:
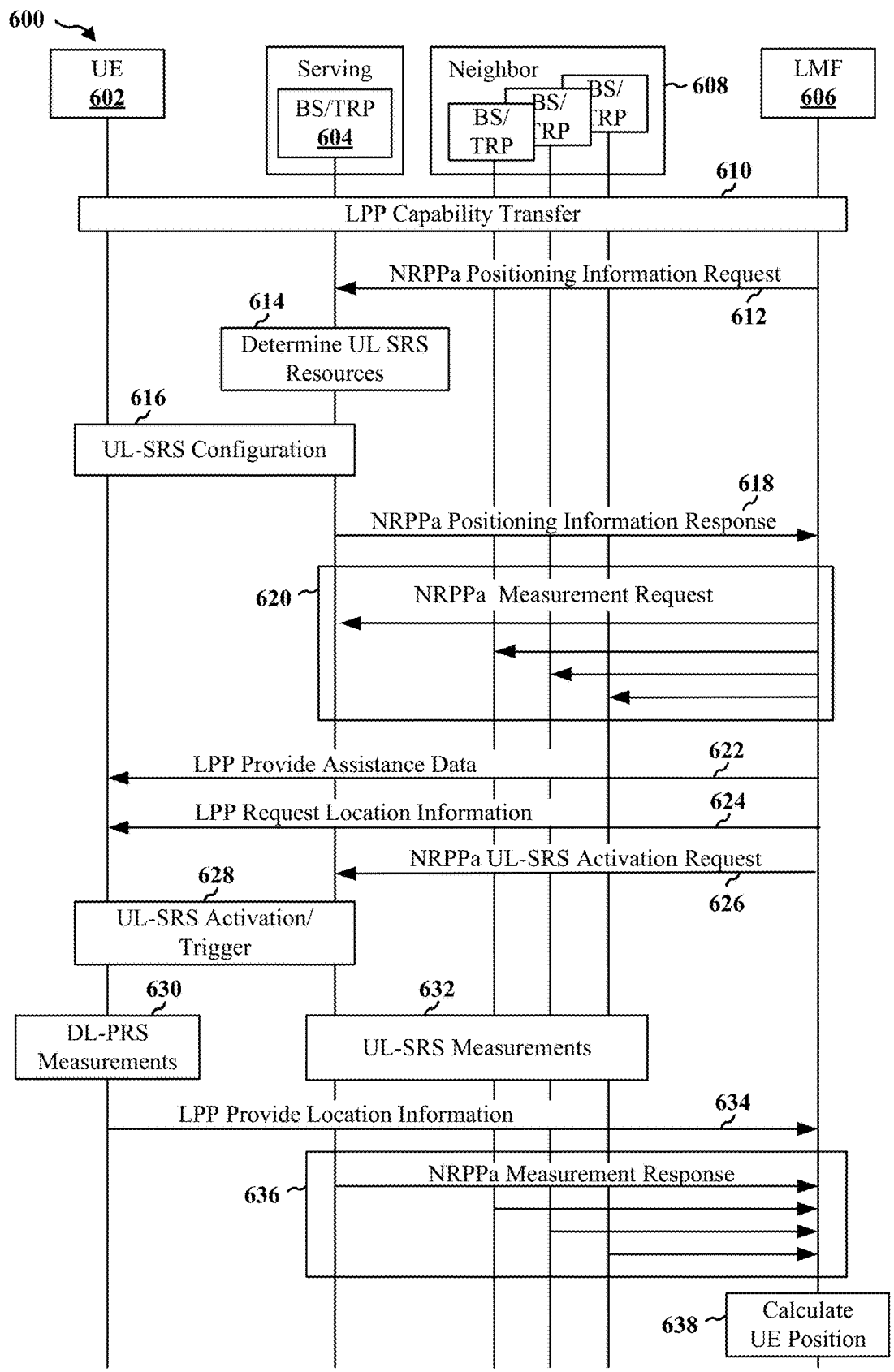
FIG. 6 is a diagram illustrating an example positioning procedure.

FIG. 6 is a communication flow 600 illustrating an example multi-RTT positioning procedure in accordance with various aspects of the present disclosure. The numberings associated with the communication flow 600 do not specify a particular temporal order and are merely used as references for the communication flow 600. In addition, a DL-only and/or an UL-only positioning may use a subset or subsets of this multi-RTT positioning procedure.

At 610, an LMF 606 may request one or more positioning capabilities from a UE 602 (e.g., from a target device). In some examples, the request for the one or more positioning capabilities from the UE 602 may be associated with an LTE Positioning Protocol (LPP). For example, the LMF 606 may request the positioning capabilities of the UE 602 using an LPP capability transfer procedure. At 612, the LMF 606 may request UL SRS configuration information for the UE 602. The LMF 606 may also provide assistance data specified by a serving base station 604 (e.g., pathloss reference, spatial relation, and/or SSB configuration(s), etc.). For example, the LMF 606 may send an NR Positioning Protocol A (NRPPa) positioning information request message to the serving base station 604 to request UL information for the UE 602.

At 614, the serving base station 604 may determine resources available for UL SRS, and at 616, the serving base station 604 may configure the UE 602 with one or more UL SRS resource sets based on the available resources. At 618, the serving base station 604 may provide UL SRS configuration information to the LMF 606, such as via an NRPPa positioning information response message. At 620, the LMF 606 may select one or more candidate neighbor BSs/TRPs 608, and the LMF 606 may provide an UL SRS configuration to the one or more candidate neighbor BSs/TRPs 608 and/or the serving base station 604, such as via an NRPPa measurement request message. The message may include information for enabling the one or more candidate neighbor BSs/TRPs 608 and/or the serving base station to perform the UL measurements.

At 622, the LMF 606 may send an LPP provide assistance data message to the UE 602. The message may include specified assistance data for the UE 602 to perform the DL measurements. At 624, the LMF 606 may send an LPP request location information message to the UE 602 to request multi-RTT measurements. At 626, for semi-persistent or aperiodic UL SRS, the LMF 606 may request the serving base station 604 to activate/trigger the UL SRS in the UE 602. For example, the LMF 606 may request activation of UE SRS transmission by sending an NRPPa positioning activation request message to the serving base station 604.

At 628, the serving base station 604 may activate the UE SRS transmission and send an NRPPa positioning activation response message. In response, the UE 602 may begin the UL-SRS transmission according to the time domain behavior of UL SRS resource configuration. At 630, the UE 602 may perform the DL measurements from the one or more candidate neighbor BSs/TRPs 608 and/or the serving base station 604 provided in the assistance data. At 632, each of the configured one or more candidate neighbor BSs/TRPs 608 and/or the serving base station 604 may perform the UL measurements. At 634, the UE 602 may report the DL measurements to the LMF 606, such as via an LPP provide location information message. At 636, each of the one or more candidate neighbor BSs/TRPs 608 and/or the serving base station 604 may report the UL measurements to the LMF 606, such as via an NRPPa measurement response message. At 638, the LMF 606 may determine the RTTs from the UE 602 and BS/TRP Rx-Tx time difference measurements for each of the one or more candidate neighbor BSs/TRPs 608 and/or the serving base station 604 for which corresponding UL and DL measurements were provided at 634 and 636, and the LMF 606 may calculate the position of the UE 602.

Some aspects of wireless communication may utilize different types of positioning reference signals (PRSs), such as downlink (DL) PRSs. PRSs are utilized by different wireless communications (e.g., new radio (NR)) and positioning methods in order to enable devices (e.g., UEs) to detect and measure different objects. For example, PRSs may enable UEs to detect and measure an increased about of neighbor TRPs or base stations. Several different types of positioning configurations are supported in wireless communications in order to enable a variety of deployments or environments for the devices or UEs (e.g., indoor environments, outdoor environments, sub-6 environments, mmW environments). Both UE-assisted positioning methods (e.g., calculations) and UE-based position methods are supported by different types of wireless communications (e.g., NR). Further, some types of positioning methods may be supported by specific types of wireless communication (e.g., NR). For instance, NR positioning methods may support at least one of: NR multiple round trip time (multi-RTT) positioning, NR downlink (DL) time difference of arrival (DL-TDOA) positioning, or NR DL angle of departure (DL-AoD) positioning.

In some aspects, different types of reference signals (e.g., downlink (DL) or uplink (UL) reference signals) and UE measurements may be utilized to facilitate the support of different positioning techniques. For example, DL PRSs and DL reference signal time difference (RSTD) UE measurements may facilitate support of DL-TDOA positioning. Also, DL PRSs and DL PRS reference signal received power (RSRP) UE measurements may facilitate support of DL-TDOA positioning, DL-AoD positioning, and/or multi-RTT positioning. Moreover, DL PRSs and sounding reference signals (SRS) for positioning and UE reception (Rx)-transmission (Tx) time different UE measurements may facilitate support of multi-RTT positioning. Further, synchronization signal blocks (SSBs) and channel state information (CSI)-reference signals (CSI-RSs) for radio resource management (RRM), as well as synchronization signal (SS)-RSRP (e.g., RSRP for RRM), SS-reference signal received quality (SS-RSRQ) (e.g., for RRM), CSI-RSRP (e.g., for RRM), and CSI-RSRP (e.g., for RRM), may facilitate support of enhanced-cell identifier (ID) (E-CID) positioning.

Different aspects of positioning may also utilize preconfigured DL PRS assistance data (AD). Preconfigured DL PRS AD may refer to the DL-PRS assistance data (with associated validity criteria) that may be provided to the UE (e.g., before or during an ongoing LTE positioning protocol (LPP) positioning session), to be then utilized for potential positioning measurements at a subsequent time (e.g., for deferred mobile terminated location request (MT-LR)). In some aspects, pre-configured DL-PRS assistance data may include multiple instances, where each instance may be applicable to a different area within the network. Also, each DL-PRS assistance data instance may be associated with an area ID. In some instances, the area ID may include a list of cells where the UE may be camped on/connected. Further, an applicable area ID at the UE location may be selected based on the cell where the UE is camped on/connected. The instance of the assistance data may be valid/selected if the UE is camped on/connected to one of the cells indicated within the list of cells in the area ID.

Figure 7:
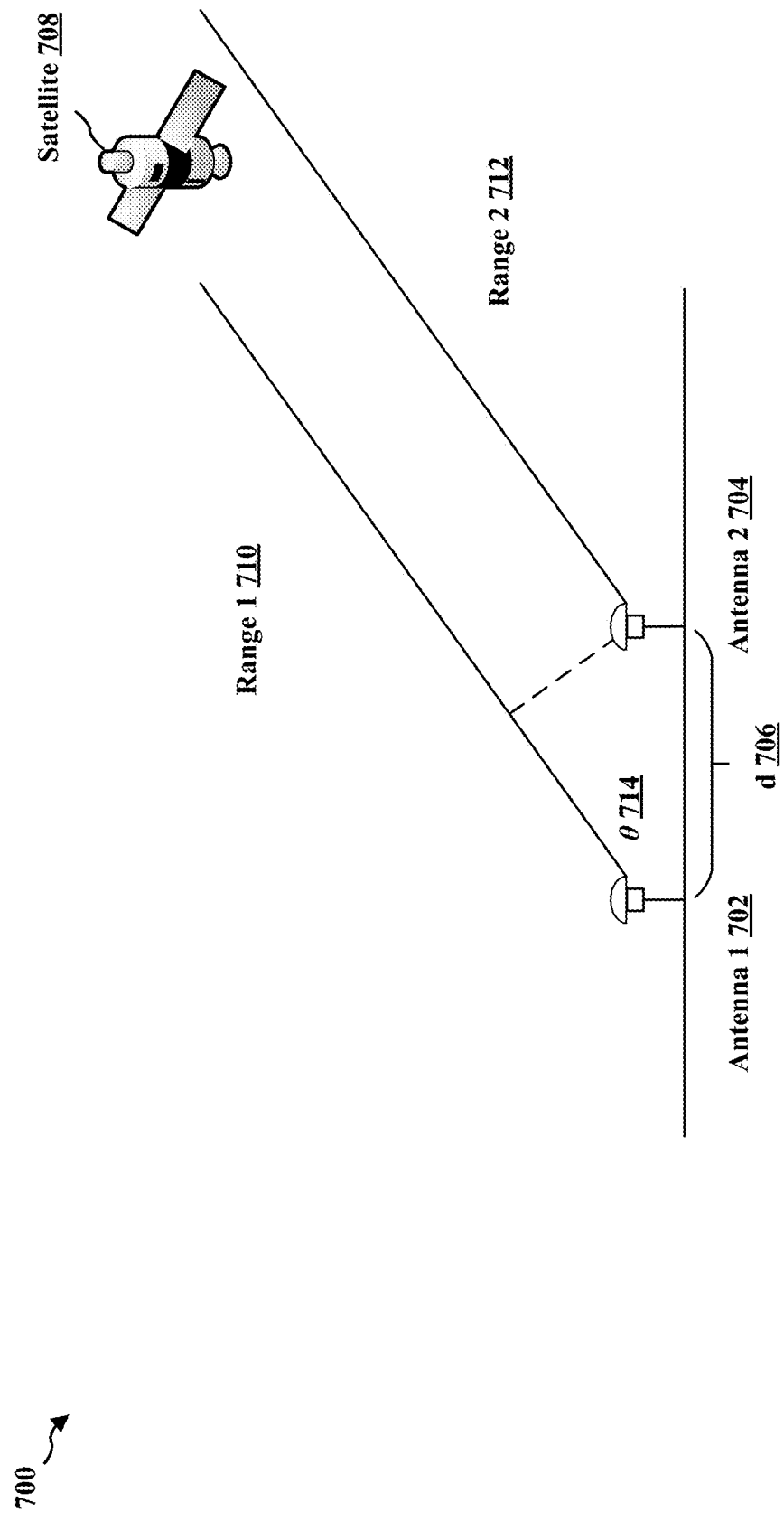
FIG. 7 is a diagram illustrating an example of determining a direction of arrival (DoA) of a signal using multiple antennas.

FIG. 7 is a diagram 700 illustrating an example of determining a direction of arrival (DoA) of a signal using multiple antennas. A UE may be configured with multiple antennas to facilitate wireless communications. The multiple antennas may also be utilized to enhance positioning, navigation, and timing (PNT) functionality associated with/provided by a global navigation satellite system (GNSS) by determining a DoA of a signal (e.g., a reference signal). In one example, the multiple antennas may facilitate removing multipath signal and/or non-line-of-sight (NLOS) signals that may interfere with PNT functionality. Multipath may refer to a propagation phenomenon that results in a radio signal reaching a receiving antenna by two or more paths. A NLOS may refer to a form of radio propagation that occurs outside of a line-of-sight (LOS) between a transmitter and a receiver, such as in ground reflections. Multipath may refer to a combination of LOS and NLOS signals. In another example, the multiple antennas may provide anti-spoofing functionality by mitigating signals from unexpected directions. Spoofing may refer to a technique in which interference is transmitted in order to make a receiver (e.g., a receiver at a UE) determine that the receiver is in a false location. During a spoofing attack, a radio transmitter located nearby a target receiver may send fake RF signals (e.g., mimicking GNSS, LEO, or terrestrial beacon signals) into the target receiver.

For example, a first antenna 702 and a second antenna 704 may be separated by a distance 706 (referred to as "d" in FIG. 7). A satellite 708 (which may also be referred to as a space vehicle (SV)) may transmit radio frequency (RF) signals (i.e., GNSS signals) that may be received by the first antenna 702 and the second antenna 704. A SV may include a GNSS satellite or a LEO satellite. In an example, a first range 710 between the first antenna 702 and the satellite 708 and a second range 712 between the second antenna 704 and the satellite 708 may be determined via measurements performed on the RF signals. With a known elevation 714 (referred to in FIG. 7 as "θ") of a GNSS signal, a relationship can be established with accurate LOS ranging information according to equation (I) below.

$$\text{range } 1 - \text{range } 2 = d \cdot \cos\theta \quad (\text{I})$$

In equation (I), "range 1" may be the first range 710, "range 2" may be the second range 712, "d" may be the distance 706, and "θ" may be the known elevation 714. Equation (I) may assume that signals propagated from the satellite 708 are received by the first antenna 702 and the second antenna 704 in LOS. If the first antenna 702 and/or the second antenna 704 receive a signal in NLOS, equation (I) may not be valid. Thus, a multiantenna GNSS system may be capable of verifying a DoA of a signal, and the multiantenna GNSS system may be robust against spoofing (i.e., transmitted from a location different from a spoofed SV) and/or multipath transmissions.

A wireless communication device equipped with multiple antennas may utilize the multiple antennas in order to determine a DoA of a signal. The DoA may then be utilized to improve GNSS PNT performance. For instance, the DoA may be utilized to remove multipath and NLOS signals and/or the DoA may be utilized for anti-spoofing purposes to mitigate signals from unexpected directions. However, some wireless communication devices may not be equipped with multiple antennas.

Various technologies pertaining to a virtual multi-antenna for enhanced RF-based PNT are described herein. In an example, a UE obtains, via an antenna of the UE, a first indication of a first measurement of at least one RF signal at a first time instance. The UE obtains, via the antenna, a second indication of a second measurement of the at least one RF signal at a second time instance. The UE calculates a distance traveled by the UE between the first time instance and the second time instance. The UE calculates a DoA of the at least one RF signal based on the first measurement, the second measurement, and the distance traveled by the UE between the first time instance and the second time instance. The UE outputs a third indication of the calculated DoA of the at least one RF signal. Vis-à-vis calculating the DoA of the at least one RF signal using the antenna (e.g., a single omni-directional antenna), the UE may emulate functionality associated with multiple antennas. For instance, the UE may utilize the DoA (calculated based on measurements performed via the antenna) in order to remove multipath and NLOS signals and/or utilize the DoA for anti-spoofing purposes to mitigate signals from unexpected directions without being equipped with multiple antennas.

Figure 8:
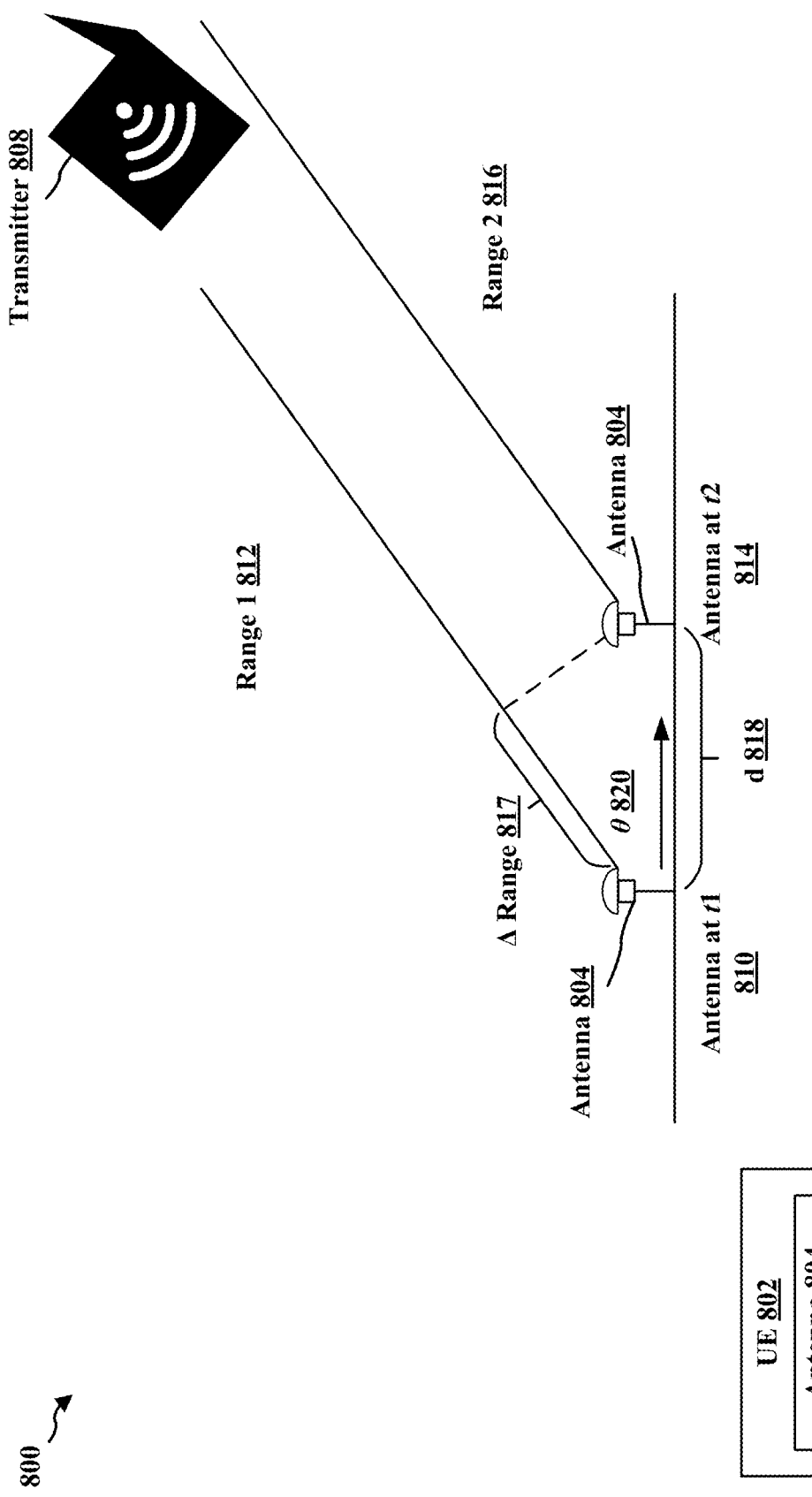
FIG. 8 is a diagram illustrating an example of determining a DoA of a signal using an antenna at a first time instance and a second time instance.

FIG. 8 is a diagram 800 illustrating an example of determining a DoA of a signal using an antenna at a first time instance and a second time instance. As used herein, the term antenna may refer to a device designed to receive and amplify radio signals transmitted on specific frequency by GNSS satellites (or other transmitting devices) and designed to convert the radio signals into an electronic signal for use by a GNSS receiver, a GPS receiver, or another type of receiver. A UE 802 may be equipped with an antenna 804 (i.e., a single mounted antenna, such as a single mounted omnidirectional antenna). A single mounted omnidirectional antenna may refer to a single antenna with an omnidirectional antenna pattern where RF waves radio equal power in directions perpendicular to an axis. The antenna 804 may be associated with a RF-based (e.g., GNSS, low earth orbit (LEO) non-terrestrial network (NTN), etc.) positioning receiver. As will be described in greater detail below, the UE 802 may emulate a multiantenna system using the antenna 804, that is, the antenna 804 may be used as a virtual multiantenna.

For example, a transmitter 808 (i.e., a signal beacon) may transmit a RF signal (e.g., a reference signal). In one aspect, the transmitter 808 may be part of a terrestrial network (TN). For instance, the transmitter 808 may be a base station, a network node, a network entity, etc. In another aspect, the transmitter 808 may be part of a non-terrestrial network (NTN). For instance, the transmitter 808 may be part of a GNSS, the transmitter 808 may be a LEO satellite, the transmitter 808 may be a SV, etc.

As the UE 802 moves with the antenna 804, measurements at different epochs (i.e., time instances) may be treated as signals received by multiple antennas. For instance, at a first time instance 810 (referred to in FIG. 8 as "Antenna at t1"), the UE 802 may measure, via the antenna 804, a RF signal transmitted by the transmitter 808 to determine a first range 812 between the antenna 804 and the transmitter 808 at the first time instance 810. Furthermore, at a second time instance 814 (referred to in FIG. 8 as "Antenna at t2"), the UE 802 may measure, via the antenna 804, the RF signal transmitted by the transmitter 808 to determine a second range 816 between the antenna 804 and the transmitter 808 at the second time instance 814. As used herein, the term "measurement of an RF signal" may include pseudorange measurements, carrier phase measurements, Doppler measurements, etc. for GNSS or LEO satellites. Pseudorange measurements and carrier phase measurements may refer to range measurements and Doppler measurements may refer to range rate measurements.

The UE 802 may determine a distance 818 (referred to in FIG. 8 as "d") travelled by the UE 802 between the first time instance 810 and the second time instance 814 via a dead-reckoning procedure and/or an inertial measurement unit (IMU) 806 of the UE 802. Dead reckoning may refer to a process of calculating a position of the UE 802 using a previously determined position, or fix, and incorporating estimates of speed, heading (or direction or course), and elapsed time. The IMU 806 may be an electronic device that measures and reports a specific force, angular rate, and/or orientation of the UE 802 using a combination of accelerometer(s), gyroscope(s), and/or magnetometer(s). The distance 818 may also be referred to as "an antenna separation."

When the UE 802 is not perpendicular to a LOS of the signal transmitted by the transmitter 808, the UE 802 may utilize measurements of the first range 812 and the second range 816 to determine a delta range 817 (i.e., a difference) at consecutive epochs (i.e., the first time instance 810 and the second time instance 814) to determine and/or confirm a DoA 820 (referred to in FIG. 8 as "θ") of the signal transmitted by the transmitter 808. The DoA 820 may be utilized to enhance PNT functionality. For instance, the UE 802 may utilize the DoA 820 to remove multipath/NLOS signals and/or the UE 802 may utilize the DoA 820 for anti-spoofing purposes to mitigate signals from unexpected directions.

Figure 9:
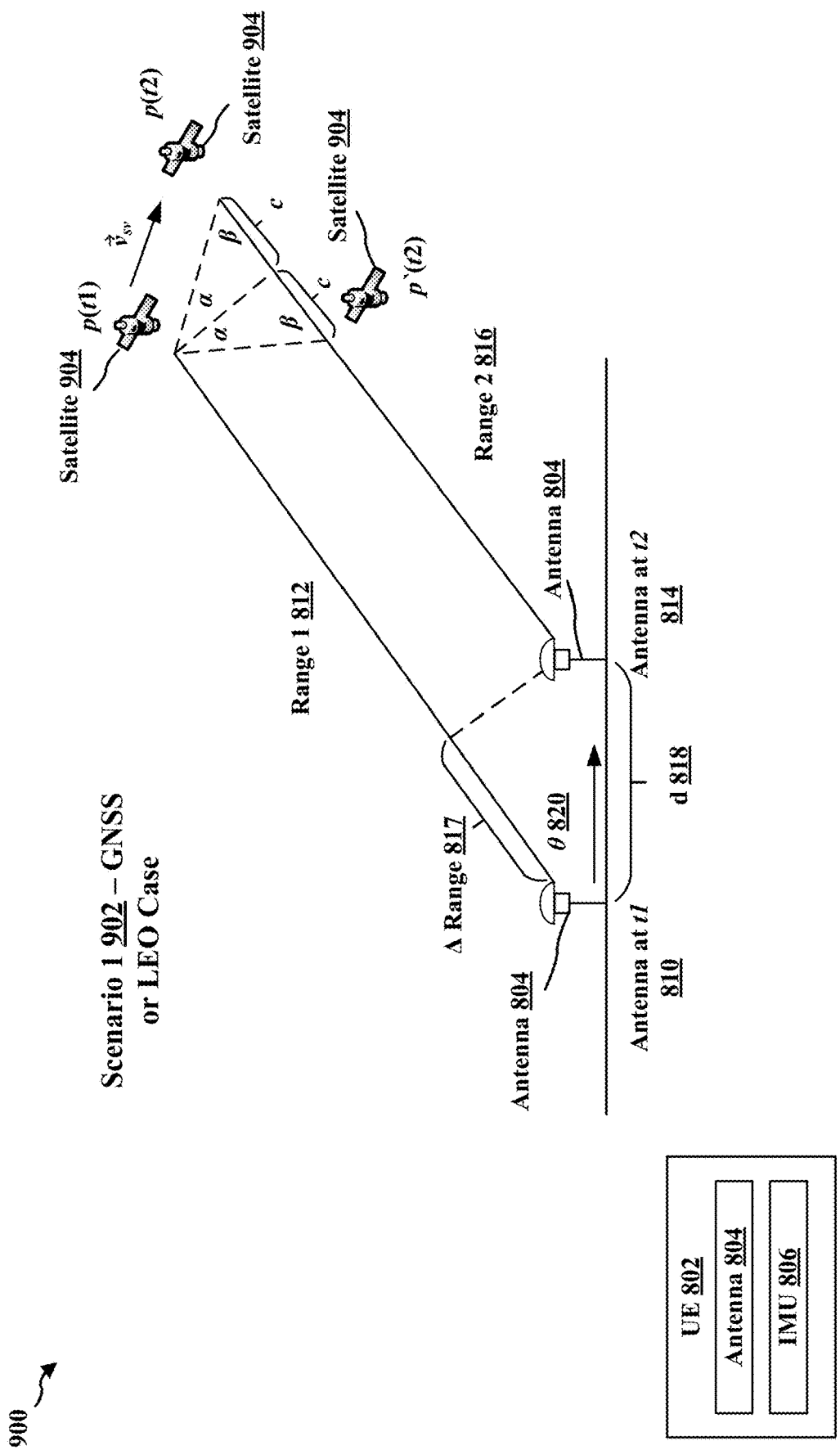
FIG. 9 is a diagram illustrating an example of determining a DoA of a signal transmitted by a satellite using an antenna at a first time instance and a second time instance.

FIG. 9 is a diagram 900 illustrating an example of determining a DoA of a signal transmitted by a satellite using an antenna at a first time instance and a second time instance. More specifically, the diagram 900 depicts a first scenario 902 in which the transmitter 808 is a signal beacon associated with a satellite 904. The satellite 904 may be a GNSS associated satellite or a LEO satellite.

In the first scenario 902, a signal beacon associated with the satellite 904 may move from a first position (p(t1)) at the first time instance 810 to a second position (p(t2)) at the second time instance 814 with a velocity $\vec{v}_{SV}$. Stated differently, the satellite 904 may change positions with respect to the UE 802 while a distance between the satellite 904 and a surface of the Earth (or another planet) remains equal (or within a threshold value). Additionally, or alternatively, the signal beacon associated with the satellite 904 may move from the first position (p(t1)) at the first time instance 810 to a third position (p'(t2)) at the second time instance 814 with the velocity $\vec{v}_{SV}$. Stated differently, the satellite 904 may change positions with respect to the UE 802 while a distance between the satellite 904 and a surface of the Earth (or another planet) varies (or varies greater than a threshold value). In either case, the satellite 904 may undergo a position change "c." From the first time instance 810 to the second time instance 814, the UE 802 may travel the distance 818 and the UE 802 may stably track signals with the DoA 820 (e.g., θ, an elevation). If a RF signal transmitted by the satellite 904 is LOS, the following relationships in equations (II)-(VI) below may be true.

$$\Delta range \equiv range\ 1 - range\ 2 \pm c = d \cdot \cos\vartheta \quad \text{(II)}$$

-continued
$$c = (\vec{v}_{SV}\Delta t) \cdot \sin\alpha \quad \text{(III)}$$

$$\Delta t = t2 - t1 \quad \text{(IV)}$$

$$\alpha = 90° - \beta \quad \text{(V)}$$

$$\sin\beta = \frac{\overrightarrow{LOS} \times \vec{v}_{SV}}{|LOS| \cdot |v_{SV}|} \quad \text{(VI)}$$

In equation (II), "Δrange" may be the delta range 817, "range 1" may be the first range 812, and "range 2" may be the second range 816. In one example, "c" may be added in equation (II) when the satellite 904 changes positions with respect to the UE 802 while the distance between the satellite 904 and a surface of the Earth (or another planet) remains equal (or within a threshold value). In another example, "c" may be subtracted in equation (II) when the satellite 904 changes positions with respect to the UE 802 while the distance between the satellite 904 and the surface of the Earth (or another planet) varies (or varies greater than a threshold value). In equation (II), "d" may be the distance 818 and "θ" may be the DoA 820. In equation (III) and equation (IV), "Δt" may be a difference between the first time instance 810 and the second time instance 814. In equation (III) and equation (V), "α" may be an angle between the second position (either p(t2) or p'(t2)), the first position (p(t1)) and a perpendicular component with respect to the first position and the second range 816. In equation (V) and equation (VI), "β" may be an angle between the first position (p(t1)), the second position (either p(t2) or p'(t2)), and the perpendicular component with respect to the first position and the second range 816. In equation (III) and equation (VI), $\vec{v}_{SV}$ may refer to a velocity (i.e., a vector) of the satellite 904. In equation (VI), $|v_{SV}|$ may refer to a magnitude of the velocity $\vec{v}_{SV}$. In equation (VI), $\overrightarrow{LOS}$ may refer to a vector associated with the first range 812 or the second range 816. For instance, $\overrightarrow{LOS}$ may be a vector from a position of the antenna 804 at the first time instance 810 to the first position p(t1) of the satellite 904, a vector from the first position p(t1) of the satellite 904 to the position of the antenna 804 at the first time instance 810, a vector from a position of the antenna 804 at the second time instance 814 to the second position (either p(t2) or p'(t2)) of the satellite 904, or a vector from the second position (either p(t2) or p'(t2)) of the satellite 904 to the position of the antenna 804 at the second time instance 814. In equation (VI), |LOS| may refer to a magnitude of $\overrightarrow{LOS}$.

The UE 802 may perform a first measurement of a RF signal transmitted by the satellite 904 at the first time instance 810 via the antenna 804, perform a second measurement of the RF signal transmitted by the satellite 904 at the second time instance 814 via the antenna 804, and utilize equations (II)-(VI) above to derive the DoA 820 (i.e., a GNSS signal DoA (θ)). The UE 802 may compare the DoA 820 to an expected DoA from an almanac and/or satellite ephemeris in order to determine whether the RF signal transmitted by the satellite 904 is LOS (at the second time instance 814). The almanac may include data (i.e., almanac data) that includes orbital parameters for space vehicles. Each space vehicle may broadcast almanac data for space vehicles. Almanac data may not be as precise as other forms of data (e.g., satellite ephemeris data) and may be valid for several months. Satellite ephemeris may include data (i.e., satellite ephemeris data) that includes prices orbital orientations and clock orientations for space vehicles and may be utilized for precise positioning. In one example, if the DoA 820 is 30° and the expected DoA is 30°, the RF signal may be LOS (at the second time instance 814). In another example, if the DoA 820 is 60° and the expected DoA is 30°, the RF signal may be NLOS (at the second time instance 814).

Table 2 below provides details with respect to sensitivity for the first scenario 902 involving a GNSS or LEO satellite (i.e., a NTN). In Table 2, ranging accuracy may be 20 cm (~GPS layer (L1) carrier phase) and a speed of the UE 802 may be 1 m/s. In Table 2, a NLOS signal may not be common for a high elevation SV, such as in case 5 below.

TABLE 2

NTN Sensitivity

| Case | DoA (θ) | Minimum Separation (d) | Sampling Rate |
|---|---|---|---|
| 1 (low elevation) | Larger and near 0° | ~20.0 cm | >0.2 sec |
| 2 | 30° | 23.1 cm | >0.23 sec |
| 3 | 45° | 28.3 cm | >0.28 sec |
| 4 | 60° | 40.0 cm | >0.4 sec |
| 5 (high elevation) | Smaller and near 90° | ∞ | N/A |

Figure 10:
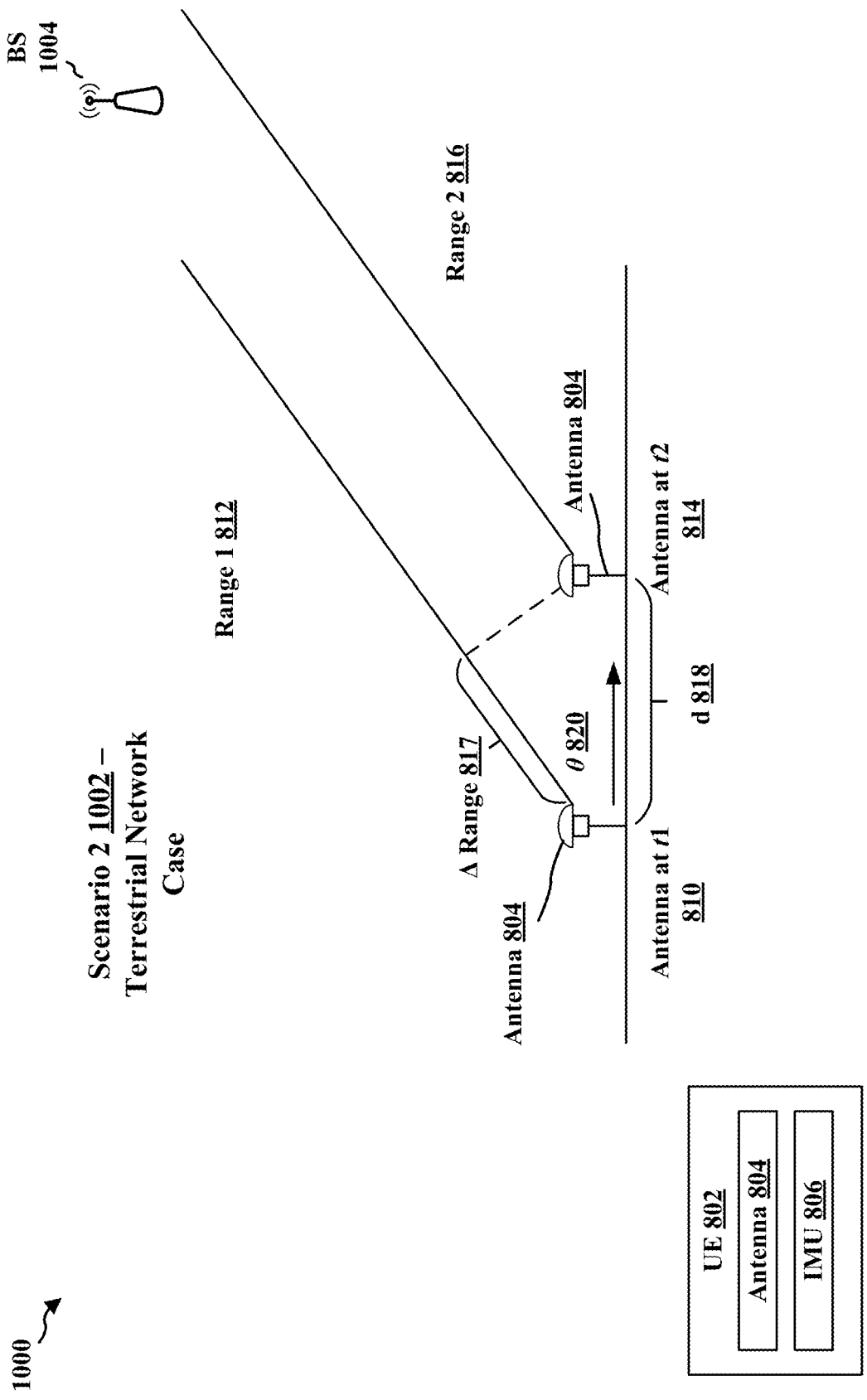
FIG. 10 is a diagram illustrating an example of determining a DoA of a signal transmitted by a terrestrial network using an antenna at a first time instance and a second time instance.

FIG. 10 is a diagram 1000 illustrating an example of determining a DoA of a signal transmitted by a terrestrial network using an antenna at a first time instance and a second time instance. More specifically, the diagram 1000 depicts a second scenario 1002 in which the transmitter 808 is a signal beacon associated with a terrestrial network. For instance, the terrestrial network may include a base station 1004 (which may also be referred to as a cell station).

In the second scenario 1002, the base station 1004 may not move from the first time instance 810 to the second time instance 814. From the first time instance 810 to the second time instance 814, the UE 802 may travel the distance 818 and the UE 802 may stably track signals with the DoA 820 (e.g., θ, an azimuth). An azimuth may be an angular measurement in a spherical coordinate system and may refer to a horizontal angle from a cardinal direction (e.g., north). In some instances, θ may be an elevation. An elevation may refer to angle between an object and an observer's local horizon. If a RF signal transmitted by the base station 1004 is LOS, the following relationships in equation (VII) below may be true.

$$\Delta\text{range} \equiv \text{range 1} - \text{range 2} = d \cdot \cos \theta \quad \text{(VII)}$$

In equation (VII), "Δrange" may be the delta range 817, "range 1" may be the first range 812, and "range 2" may be the second range 816. Furthermore, in equation (VII), "d" may be the distance 818 and "θ" may be the DoA 820.

The UE 802 may perform a first measurement of a RF signal transmitted by the base station 1004 at the first time instance 810 via the antenna 804, perform a second measurement of the RF signal transmitted by the base station 1004 at the second time instance 814 via the antenna 804, and utilize equation (VII) above to derive the DoA 820 (i.e., a TN beacon signal DoA (θ)). The UE 802 may compare the DoA 820 to an expected DoA from communication data received by the UE 802 from the base station 1004 in order to determine whether the RF signal transmitted by the base station 1004 is LOS (at the second time instance 814). In one example, if the DoA 820 is 30° and the expected DoA is 30°, the RF signal may be LOS (at the second time instance 814). In another example, if the DoA 820 is 60° and the expected DoA is 30°, the RF signal may be NLOS (at the second time instance 814). In one aspect, the distance 818 travelled by the UE 802 may be less than a threshold distance in order for the parallel signal LOS assumption to be valid.

Table 3 below provides example details with respect to sensitivity for the second scenario 1002 involving a TN. In Table 3, consecutive signals may be considered to be parallel if a LOS angle≤0.1° and maximum separation may be provided by $$d_{max} = \frac{2\pi r}{3600}.$$

Furthermore, in Table 3, a speed of the UE 802 may be 1 m/s.

TABLE 3

TN Sensitivity - UE Speed 1 m/s

| Case | Beacon-UE distance (r) | Maximum Separation (d) | Sampling Rate |
|---|---|---|---|
| 1 | 10 km | 17.45 m | 17.45 s |
| 2 | 1 km | 1.75 m | 1.75 s |
| 3 | 100 m | 17.5 cm | 0.175 s |
| 4 | 10 m | 1.75 cm | 0.0175 s |
| 5 | 1 m | 0.175 cm | 0.00175 s |

Table 4 below provides example details with respect to sensitivity for the second scenario 1002 involving a TN. In Table 4, a ranging accuracy may be 10 m.

TABLE 4

TN Sensitivity - Ranging Accuracy 10 m

| Case | DoA (θ) | Minimum Separation (d) |
|---|---|---|
| 1 | Larger and near 0° | 10 m |
| 2 | 30° | 11.5 m |
| 3 | 45° | 14.1 m |
| 4 | 60° | 20 m |
| 5 | Smaller and near 90° | ∞ |

In one aspect, the UE 802 may utilize the virtual multi-antenna procedure described above when a beacon-UE distance (e.g., the first range 812 and/or the second range 816) is greater than 10 km for an azimuth that is less than or equal to approximately 55°. In one aspect, if the UE 802 is a 5G NR UE with a higher ranging accuracy such as 1 m, the virtual multiantenna procedure described above may be utilized when the beacon-UE distance is 1 km.

Figure 11:
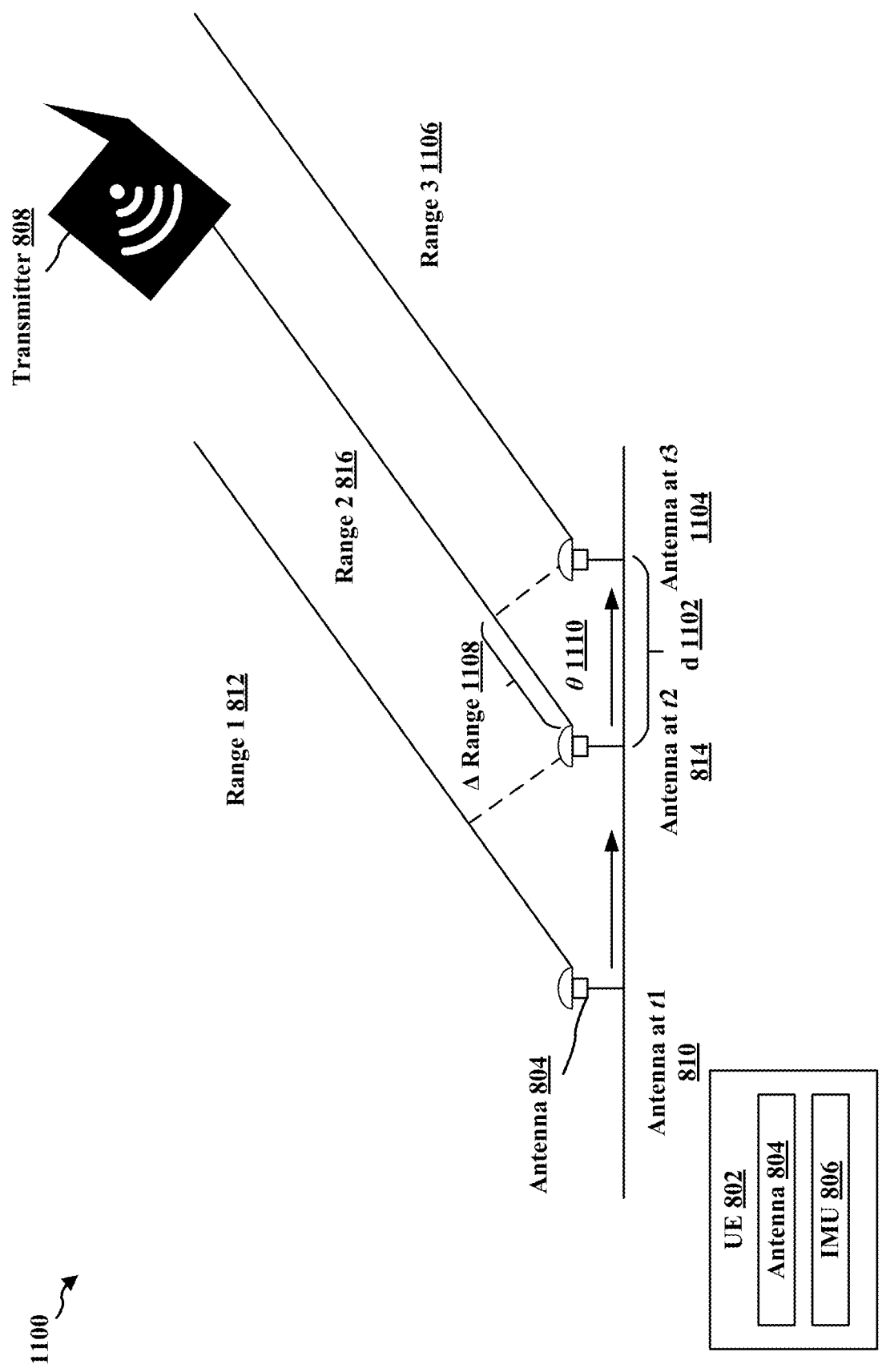
FIG. 11 is a diagram illustrating an example of determining a DoA of a signal using an antenna at different time instances.

FIG. 11 is a diagram 1100 illustrating an example of determining a DoA of a signal using an antenna at different time instances. For instance, the UE 802 may operate with stable signal tracking and the UE 802 may generate accurate positioning measurements (e.g., accurate measurements of the first range 812 and the second range 816). The UE 802 may confirm that RF signals transmitted by the transmitter 808 are LOS using aspects (e.g., performing measurements to obtain the first range 812 and the second range 816 and utilizing equations (II)-(VII)) discussed above in relation to FIGS. 8-10.

The UE 802 may travel a distance 1102 (referred to in FIG. 11 as "d") between the second time instance and a third time instance 1104 occurring after the second time instance 814. The UE 802 may compute the distance 1102 if an estimation of location states (e.g., position, velocity, and acceleration) at the first time instance 810 and the second time instance 814 is accurate, if the IMU 806 of the UE 802 is available for measurements, or if another relative positioning technique (e.g., dead reckoning) is available.

The UE 802 may perform a third measurement on the RF signal transmitted by the transmitter 808 to determine a third range 1106 between the antenna 804 and the transmitter 808 at the third time instance 1104. The UE 802 may determine a delta range 1108 (referred to in FIG. 11 as "Δ range") between the second range 816 and the third range 1106 (similar to that described above with respect to the delta range 817). In one aspect with respect to a GNSS, the UE 802 may utilize a delta carrier phase with an accurate time drift in order to determine the delta range 1108. When the delta range 1108 and the distance 1102 are obtained by the UE 802, the UE 802 may determine a DoA 1110 of the RF signal transmitted by the transmitter 808 at the third time instance 1104.

If the DoA 1110 is equal to (or within a threshold range of) an expected DoA of the RF signal (e.g., as ascertained through an almanac, satellite ephemeris, or communications data), the UE 802 may utilize a signal measurement from a specific beacon (e.g., the transmitter 808). If the DoA 1110 is not equal to (or not within the threshold range of) the expected DoA of the RF signal, the UE 802 may remove, correct, or de-weight the third measurement associated with the third range 1106, as the third measurement may be a NLOS measurement. Removing a measurement may refer to not utilizing the measurement. Correcting a measurement may refer to updating the measurement with a more accurate value. De-weighting a measurement may refer to assigning less weighting to the measurement in terms of usage of the measurement. An estimation correction may become less dependent on measurements with less weight and more dependent on measurements with higher weight.

Figure 12:
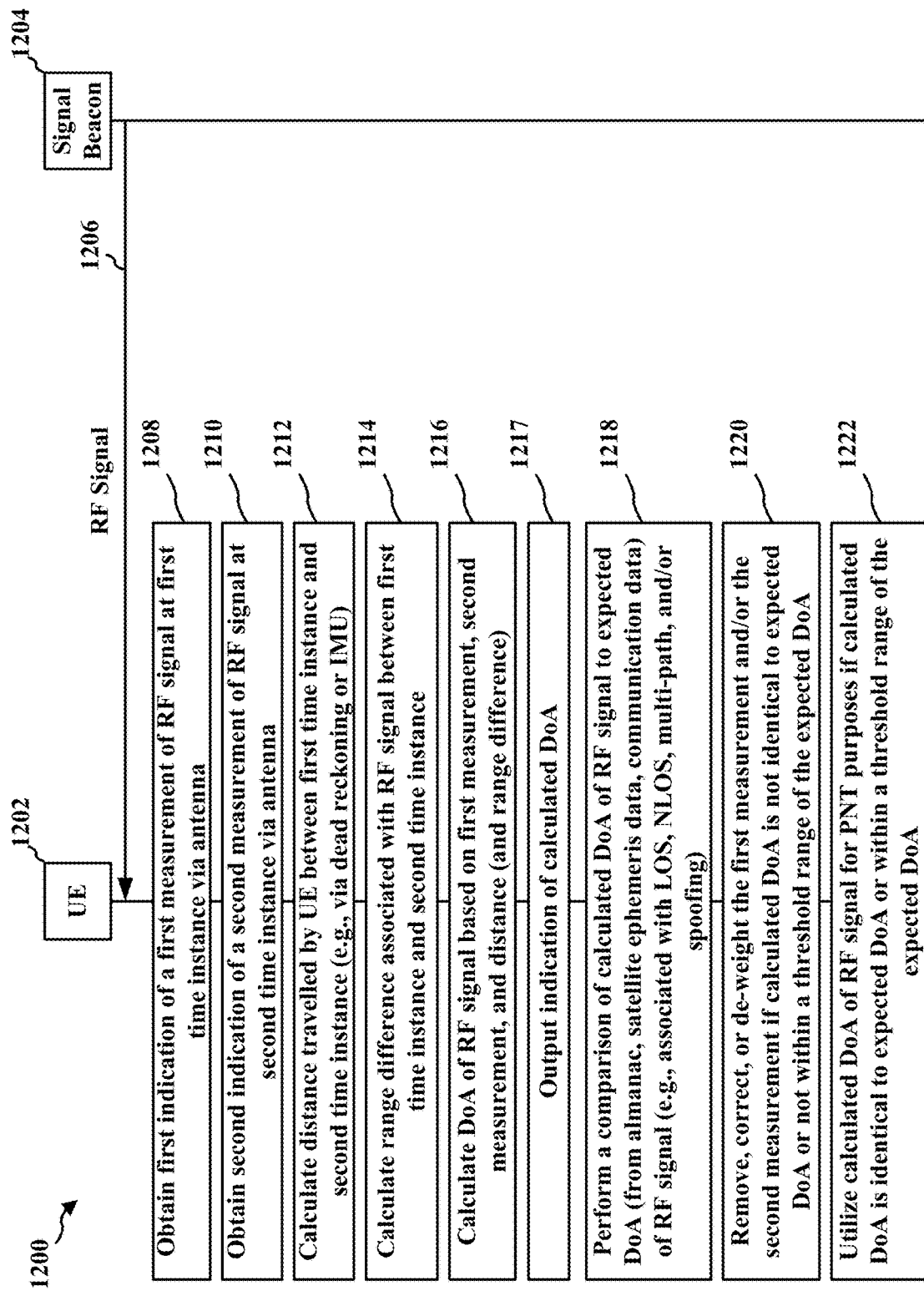
FIG. 12 is a diagram illustrating example communications between a UE and a signal beacon.

FIG. 12 is a diagram 1200 illustrating example communications between a UE 1202 and a signal beacon 1204. The UE 1202 may be the UE 104, the UE 350, the UE 404, the UE 502, the UE 602, or the UE 802. The signal beacon 1204 may be part of a TN. For instance, the signal beacon 1204 may be a base station, such as the base station 102 or the base station 310. The signal beacon 1204 may be part of a NTN. For instance, the signal beacon 1204 may be a GNSS satellite or a LEO satellite. The signal beacon 1204 may be a space vehicle (SV).

At 1206, the signal beacon 1204 may transmit a RF signal. At 1208, the UE 1202 may obtain a first indication of a first measurement of the RF signal at a first time instance via an antenna of the UE 1202. The first measurement may be indicative of a first range between the antenna and the signal beacon at the first time instance. At 1210, the UE 1202 may obtain a second indication of a second measurement of the RF signal at a second time instance via the antenna of the UE 1202. The second measurement may be indicative of a second range between the antenna and the signal beacon at the second time instance.

At 1212, the UE 1202 may calculate a distance travelled by the UE 1202 between the first time instance and the second time instance. For instance, the UE 1202 may calculate the distance via an IMU of the UE 802 and/or via a dead reckoning procedure. At 1214, the UE 1202 may calculate a range difference associated with the RF signal between the first time instance and the second time instance. At 1216, the UE 1202 may calculate a DoA of the RF signal based on the first measurement, the second measurement, and the distance (and the range difference). At 1217, the UE 102 may output an indication of the calculated DoA.

At 1218, the UE 1202 may perform a comparison of the calculated DoA of the RF signal to an expected DoA of the RF signal. The expected DoA of the RF signal may be determined via an almanac, satellite ephemeris, or communications data received by the UE 1202 from a base station. At 1220, if the calculated DoA is not identical to the expected DoA or if the calculated DoA is not within a threshold range of the expected DoA, the UE 1202 may remove, correct, and/or de-weight the first measurement and/or the second measurement. At 1222, if the calculated DoA is identical to the expected DoA or if the calculated DoA is within the threshold range of the expected DoA, the UE 1202 may utilize the calculated DoA for PNT purposes.

Figure 13:
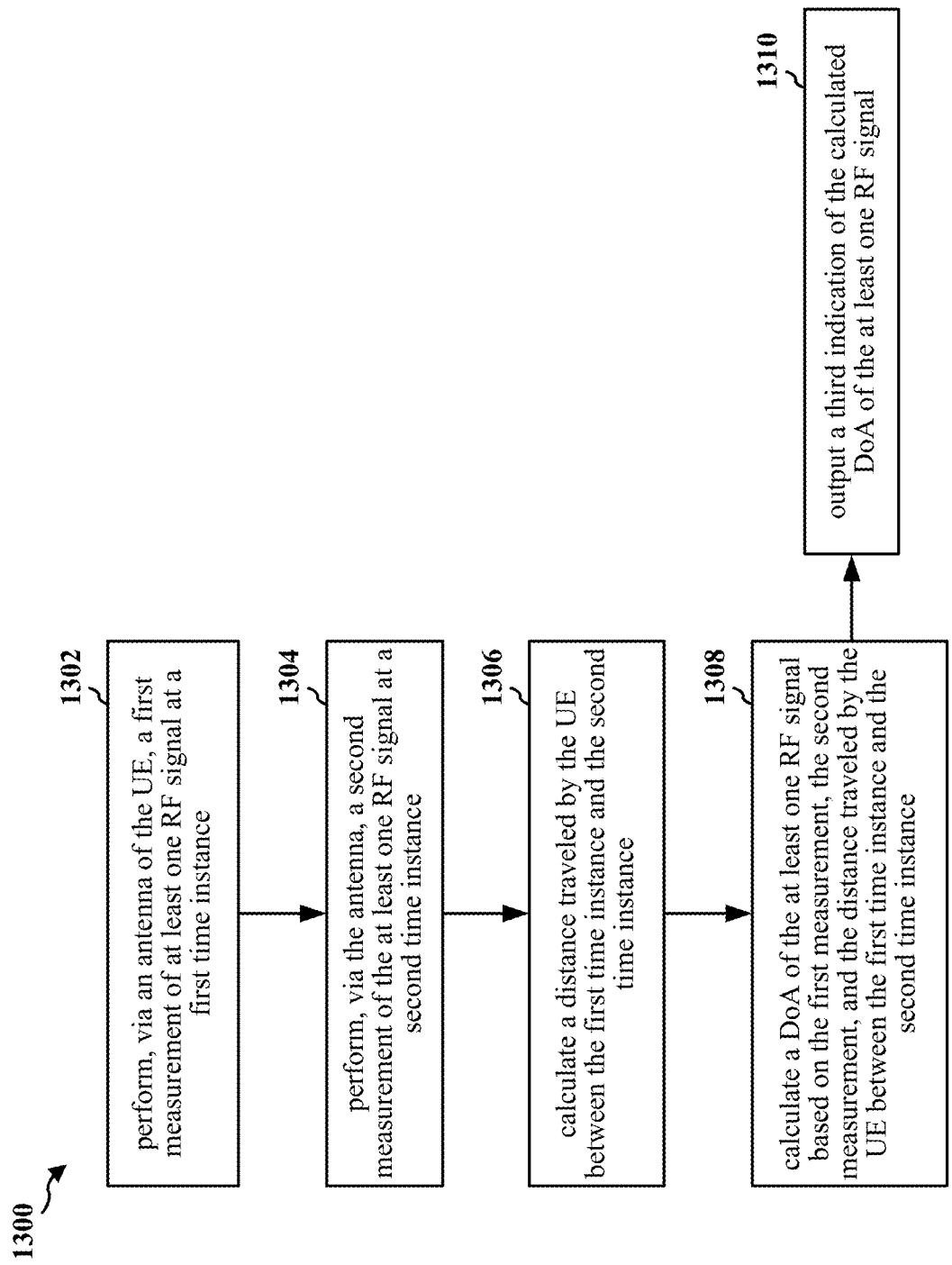
FIG. 13 is a flowchart of a method of wireless communication.

FIG. 13 is a flowchart 1300 of a method of wireless communication. The method may be performed by a UE (e.g., the UE 104, the UE 350, the UE 404, the UE 502, the UE 602, the UE 802, the UE 1202, the apparatus 1504). The method may be associated with various advantages at the UE, such as enhancing PNT functionality by removing multipath/NLOS signals and/or by providing anti-spoofing functionality. In an example, the method may be performed by the virtual multiantenna component 198.

At 1302, the UE obtains, via an antenna of the UE, a first indication of a first measurement of at least one RF signal at a first time instance. For example, FIG. 12 at 1208 shows that the UE 1202 may obtain a first indication of a first measurement of a RF signal at a first time instance via an antenna. In an example, the antenna may be the antenna 804. In another example, the first measurement may correspond to the first range 812. In a further example, the first time instance may correspond to "t1" in one or more of FIGS. 8-11. In an example, 1302 may be performed by the virtual multiantenna component 198.

At 1304, the UE obtains, via the antenna, a second indication of a second measurement of the at least one RF signal at a second time instance. For example, FIG. 12 at 1210 shows that the UE 1202 may obtain a second indication of a second measurement of the RF signal at a second time instance via the antenna. In an example, the second measurement may correspond to the second range 816. In a further example, the second time instance may correspond to "t2" in one or more of FIGS. 8-11. In an example, 1304 may be performed by the virtual multiantenna component 198.

At 1306, the UE calculates a distance traveled by the UE between the first time instance and the second time instance. For example, FIG. 12 at 1212 shows that the UE 1202 may calculate a distance travelled by the UE between the first time instance and the second time instance. In another example, the distance may be the distance 818. In an example, 1306 may be performed by the virtual multiantenna component 198.

At 1308, the UE calculates a DoA of the at least one RF signal based on the first measurement, the second measurement, and the distance traveled by the UE between the first time instance and the second time instance. For example, FIG. 12 at 1216 shows that the UE 1202 may calculate a DoA of the RF signal based on the first measurement, the second measurement, and the distance. In an example, the DoA of the at least one RF signal may be the DoA 820 or the DoA 1110. In an example, 1308 may be performed by the virtual multiantenna component 198.

At 1310, the UE outputs a third indication of the calculated DoA of the at least one RF signal. For example, FIG. 12 at 1217 shows that the UE 1202 may output an indication of the calculated DoA of the at least one RF signal. In an example, 1310 may be performed by the virtual multiantenna component 198.

Figure 14:
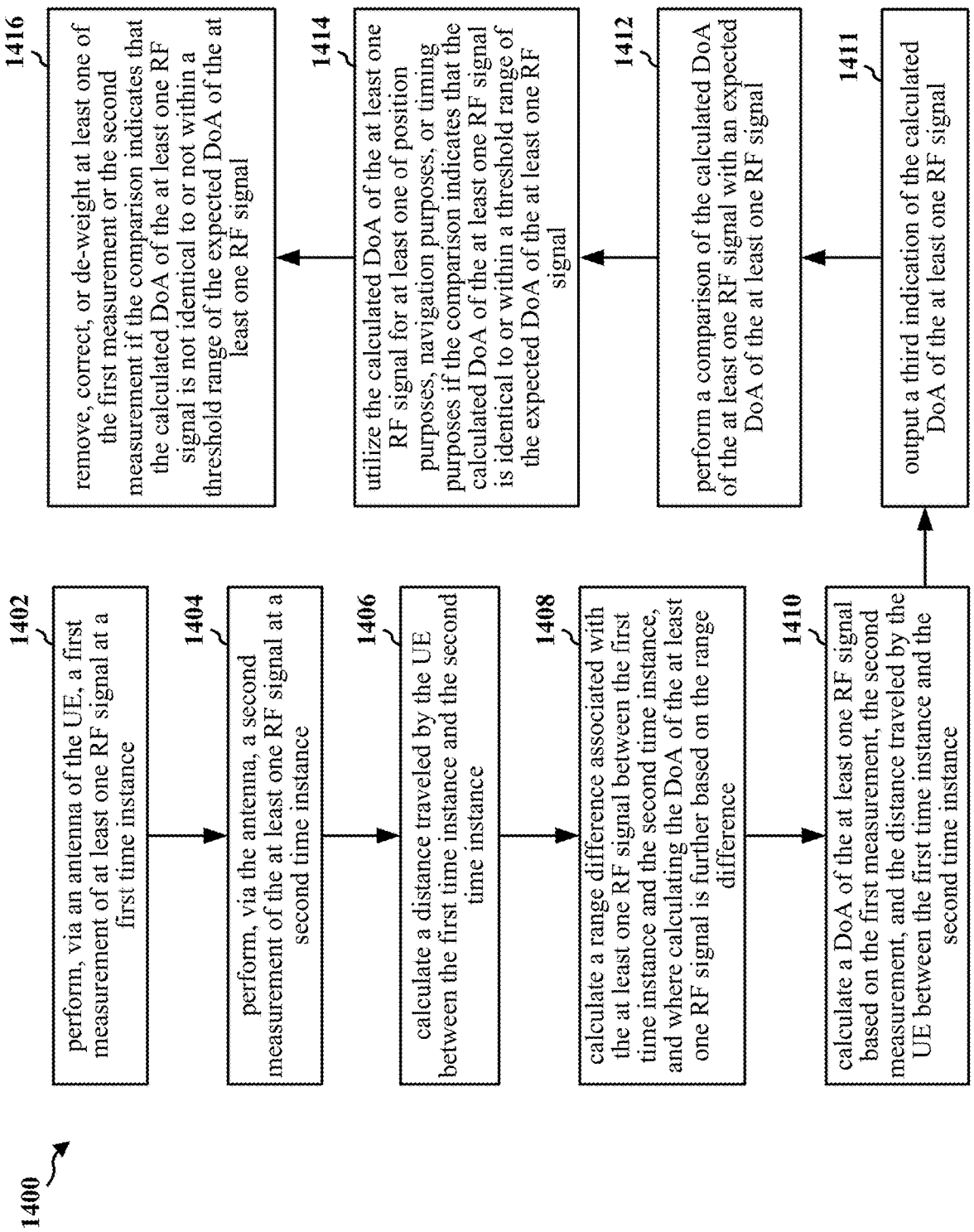
FIG. 14 is a flowchart of a method of wireless communication.

FIG. 14 is a flowchart 1400 of a method of wireless communication. The method may be performed by a UE (e.g., the UE 104, the UE 350, the UE 404, the UE 502, the UE 602, the UE 802, the UE 1202, the apparatus 1504). The method may be associated with various advantages at the UE, such as enhancing PNT functionality by removing multipath/NLOS signals and/or by providing anti-spoofing functionality. In an example, the method (including the various aspects detailed below) may be performed by the virtual multiantenna component 198.

At 1402, the UE obtains, via an antenna of the UE, a first indication of a first measurement of at least one RF signal at a first time instance. For example, FIG. 13 at 1208 shows that the UE 1202 may obtain a first indication of a first measurement of a RF signal at a first time instance via an antenna. In an example, the antenna may be the antenna 804. In another example, the first measurement may correspond to the first range 812. In a further example, the first time instance may correspond to "t1" in one or more of FIGS. 8-11. In an example, 1402 may be performed by the virtual multiantenna component 198.

At 1404, the UE obtains, via the antenna, a second indication of a second measurement of the at least one RF signal at a second time instance. For example, FIG. 12 at 1210 shows that the UE 1202 may obtain a second indication of a second measurement of the RF signal at a second time instance via the antenna. In an example, the second measurement may correspond to the second range 816. In a further example, the second time instance may correspond to "t2" in one or more of FIGS. 8-11. In an example, 1404 may be performed by the virtual multiantenna component 198.

At 1406, the UE calculates a distance traveled by the UE between the first time instance and the second time instance. For example, FIG. 12 at 1212 shows that the UE 1202 may calculate a distance travelled by the UE between the first time instance and the second time instance. In another example, the distance may be the distance 818. In an example, 1406 may be performed by the virtual multiantenna component 198.

At 1410, the UE calculates a DoA of the at least one RF signal based on the first measurement, the second measurement, and the distance traveled by the UE between the first time instance and the second time instance. For example, FIG. 12 at 1216 shows that the UE 1202 may calculate a DoA of the RF signal based on the first measurement, the second measurement, and the distance. In an example, the DoA of the at least one RF signal may be the DoA 820 or the DoA 1110. In an example, 1410 may be performed by the virtual multiantenna component 198.

At 1411, the UE outputs a third indication of the calculated DoA of the at least one RF signal. For example, FIG. 12 at 1217 shows that the UE 1202 may output an indication of the calculated DoA of the at least one RF signal. In an example, 1411 may be performed by the virtual multiantenna component 198.

In one aspect, at 1412, the UE may perform a comparison of the calculated DoA of the at least one RF signal with an expected DoA of the at least one RF signal. For example, FIG. 12 at 1218 shows that the UE 1202 may perform a comparison of a calculated DoA of a RF signal to an expected DoA of the RF signal. In an example, 1412 may be performed by the virtual multiantenna component 198.

In one aspect, the comparison may be associated with at least one of a LOS of the at least one RF signal, a NLOS of the at least one RF signal, a multi-path of the at least one RF signal, or a spoofing signal of an unexpected DoA of the at least one RF signal. For example, FIG. 12 at 1218 shows that the comparison may be associated with at least one of a LOS of the at least one RF signal, a NLOS of the at least one RF signal, a multi-path of the at least one RF signal, or a spoofing signal of an unexpected DoA of the at least one RF signal.

In one aspect, the expected DoA of the at least one RF signal may be based on at least one of data from an almanac, satellite ephemeris data, or communication data received from a network. For example, FIG. 12 at 1218 shows that the expected DoA of the RF signal may be based on at least one of data from an almanac, satellite ephemeris data, or communication data received from a network.

In one aspect, at 1414, the UE may utilize the calculated DoA of the at least one RF signal for at least one of position purposes, navigation purposes, or timing purposes if the comparison indicates that the calculated DoA of the at least one RF signal is identical to or within a threshold range of the expected DoA of the at least one RF signal. For example, FIG. 12 at 1222 shows that the UE 1202 may utilize the calculated DoA of the RF signal for PNT purposes if the calculated DoA is identical to the expected DoA or is within a threshold range of the expected DoA. In an example, 1414 may be performed by the virtual multiantenna component 198.

In one aspect, at 1416, the UE may remove, correct, or de-weight at least one of the first measurement or the second measurement if the comparison indicates that the calculated DoA of the at least one RF signal is not identical to or not within a threshold range of the expected DoA of the at least one RF signal. For example, FIG. 12 at 1220 shows that the UE 1202 may remove, correct, or de-weight the first measurement and/or the second measurement if the calculated DoA is not identical to the expected DoA or not within a threshold range of the expected DoA. In an example, 1416 may be performed by the virtual multiantenna component 198.

In one aspect, the antenna of the UE may be a single omnidirectional antenna. For example, the antenna 804 may be a single omnidirectional antenna.

In one aspect, calculating the distance travelled by the UE may include performing a dead-reckoning procedure for the UE. For example, FIG. 12 at 1212 shows that calculating the distance travelled by the UE 1202 may include performing a dead-reckoning procedure for the UE.

In one aspect, calculating the distance travelled by the UE may be based on one or more outputs of an IMU of the UE. For example, FIG. 12 at 1212 shows that calculating the distance travelled by the UE 1202 may be based on one or more outputs of an IMU of the UE 1202.

In one aspect, a velocity of the UE may be non-perpendicular to a LOS of the at least one RF signal between the first time instance and the second time instance. For example, FIGS. 8-11 show that a velocity of the UE 802 may be non-perpendicular to a LOS of the at least one RF signal between the first time instance and the second time instance.

In one aspect, the at least one RF signal may be associated with at least one of a terrestrial network node, a space vehicle (SV), a GNSS, or a LEO satellite. For example, FIGS. 8-10 show that the at least one RF signal may be associated with at least one of a terrestrial network node, a space vehicle (SV), a GNSS, or a LEO satellite. A terrestrial network node may include a terrestrial network signal transmitter and/or a receiver. In an example, the terrestrial network node may include a cell tower or a base station, such as a gNB.

In one aspect, the at least one RF signal may be associated with at least one of the SV, the GNSS, or the LEO satellite, and calculating the DoA of the at least one RF signal may be further based on a velocity of at least one of the SV, the GNSS, or the LEO satellite and a difference between the second time instance and the first time instance. For example, calculating the DoA of the at least one RF signal may include aspects described above in connection with equations (II)-(VI).

In one aspect, the at least one RF signal may be associated with the terrestrial network node, and the distance traveled by the UE between the first time instance and the second time instance may be less than a threshold distance. For example, FIG. 10 shows that the at least one RF signal may be associated with the terrestrial network node, and the distance traveled by the UE between the first time instance and the second time instance may be less than a threshold distance.

In one aspect, at 1408, the UE may calculate a range difference associated with the at least one RF signal between the first time instance and the second time instance, and calculating the DoA of the at least one RF signal may be further based on the range difference. For example, FIG. 12 at 1214 shows that the UE 1202 may calculate a range difference associated with a RF signal between the first time instance and the second time instance and FIG. 12 at 1216 shows that calculating the DoA of the RF signal may be based on the range difference. In an example, the range difference may be the delta range 817. In an example, 1408 may be performed by the virtual multiantenna component 198.

In one aspect, the DoA may correspond to a first elevation if the at least one RF signal is associated with a satellite, and the DOA may correspond to a second elevation or an azimuth if the at least one RF signal is associated with a terrestrial network node. For example, FIG. 9 shows that the DoA may correspond to a first elevation if the at least one RF signal is associated with a satellite and FIG. 10 shows that the DOA may correspond to a second elevation or an azimuth if the at least one RF signal is associated with a terrestrial network node.

In one aspect, outputting the third indication of the calculated DoA of the at least one RF signal may include storing, in a memory or a cache, the third indication of the calculated DoA of the at least one RF signal. For example, outputting the indication at 1217 may include storing the indication in a memory or a cache.

In one aspect, obtaining the first indication of the first measurement of the at least one RF signal at the first time instance may include performing, via the antenna of the UE, the first measurement of the at least one RF signal at the first time instance. For instance, obtaining the first indication of the first measurement at 1208 may include performing the first measurement.

In one aspect, obtaining the second indication of the second measurement of the at least one RF signal at the second time instance may include performing, via the antenna of the UE, the second measurement of the at least one RF signal at the second time instance. For instance, obtaining the second indication of the second measurement at 1210 may include performing the second measurement.

Figure 15:
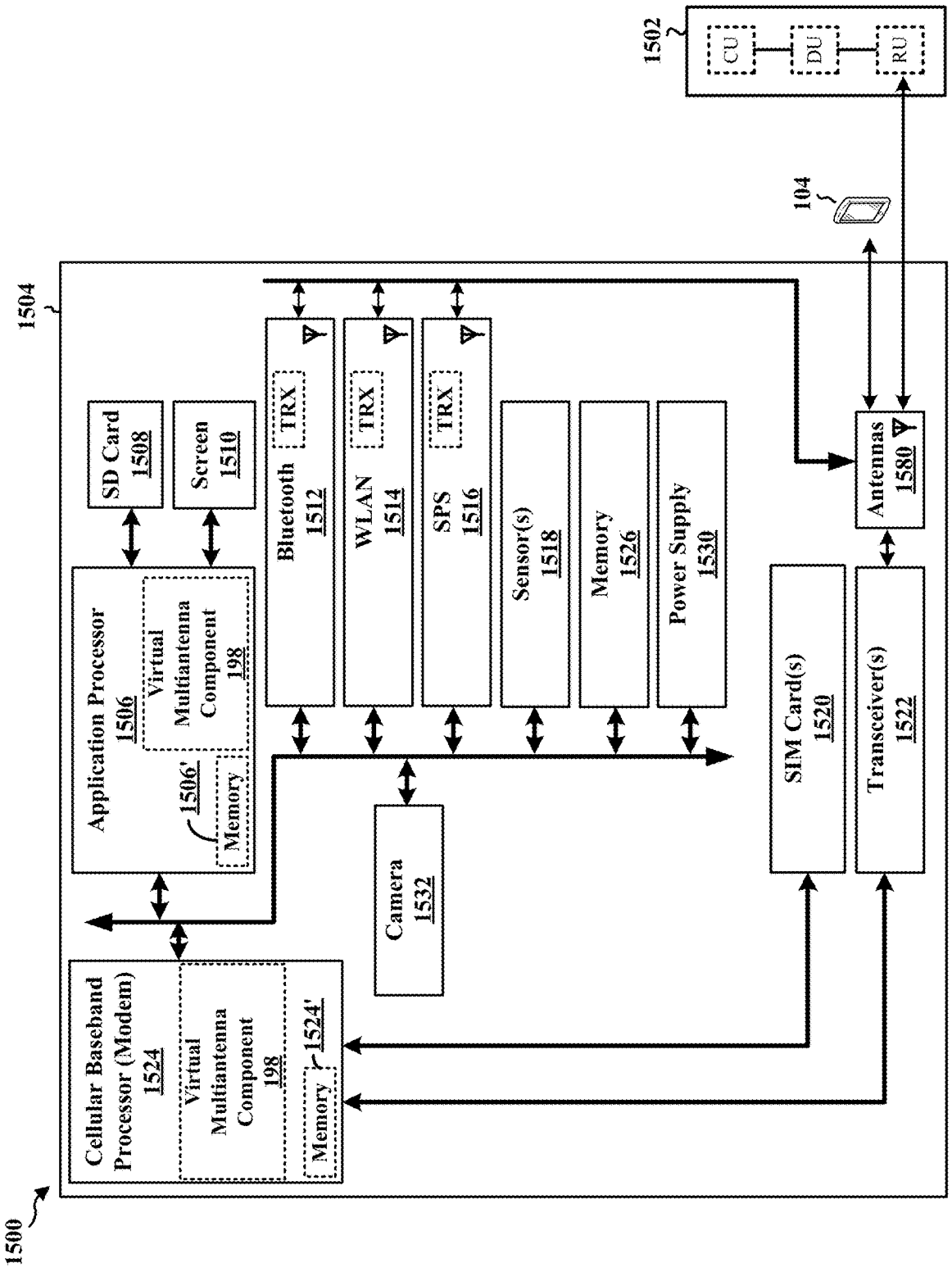
FIG. 15 is a diagram illustrating an example of a hardware implementation for an example apparatus.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the virtual multiantenna component 198 may be configured to obtain, via an antenna of the UE, a first indication of a first measurement of at least one RF signal at a first time instance. The virtual multiantenna component 198 may be configured to obtain, via the antenna, a second indication of a second measurement of the at least one RF signal at a second time instance. The virtual multiantenna component 198 may be configured to calculate a distance traveled by the UE between the first time instance and the second time instance. The virtual multiantenna component 198 may be configured to calculate a DoA of the at least one RF signal based on the first measurement, the second measurement, and the distance traveled by the UE between the first time instance and the second time instance. The virtual multiantenna component 198 may be configured to output a third indication of the calculated DoA of the at least one RF signal. The virtual multiantenna component 198 may be configured to perform a comparison of the calculated DoA of the at least one RF signal with an expected DoA of the at least one RF signal. The virtual multiantenna component 198 may be configured to utilize the calculated DoA of the at least one RF signal for at least one of position purposes, navigation purposes, or timing purposes if the comparison indicates that the calculated DoA of the at least one RF signal is identical to or within a threshold range of the expected DoA of the at least one RF signal. The virtual multiantenna component 198 may be configured to remove, correct, or de-weight at least one of the first measurement or the second measurement if the comparison indicates that the calculated DoA of the at least one RF signal is not identical to or not within a threshold range of the expected DoA of the at least one RF signal. The virtual multiantenna component 198 may be configured to calculate a range difference associated with the at least one RF signal between the first time instance and the second time instance, and where calculating the DoA of the at least one RF signal is further based on the range difference. The virtual multiantenna component 198 may be within the cellular baseband processor 1524, the application processor 1506, or both the cellular baseband processor 1524 and the application processor 1506. The virtual multiantenna component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, may include means for obtaining, via an antenna of the UE, a first indication of a first measurement of at least one radio frequency (RF) signal at a first time instance. In one configuration, the apparatus 1504, and in particular the cellular baseband processor 1524 and/or the application processor 1506, may include means for obtaining, via the antenna, a second indication of a second measurement of the at least one RF signal at a second time instance. In one configuration, the apparatus 1504, and in particular the cellular baseband processor 1524 and/or the application processor 1506, may include means for calculating a distance traveled by the UE between the first time instance and the second time instance. In one configuration, the apparatus 1504, and in particular the cellular baseband processor 1524 and/or the application processor 1506, may include means for calculating a direction of arrival (DoA) of the at least one RF signal based on the first measurement, the second measurement, and the distance traveled by the UE between the first time instance and the second time instance. In one configuration, the apparatus 1504, and in particular the cellular baseband processor 1524 and/or the application processor 1506, may include means for outputting a third indication of the calculated DoA of the at least one RF signal. In one configuration, the apparatus 1504, and in particular the cellular baseband processor 1524 and/or the application processor 1506, may include means for performing a comparison of the calculated DoA of the at least one RF signal with an expected DoA of the at least one RF signal. In one configuration, the apparatus 1504, and in particular the cellular baseband processor 1524 and/or the application processor 1506, may include means for utilizing the calculated DoA of the at least one RF signal for at least one of position purposes, navigation purposes, or timing purposes if the comparison indicates that the calculated DoA of the at least one RF signal is identical to or within a threshold range of the expected DoA of the at least one RF signal. In one configuration, the apparatus 1504, and in particular the cellular baseband processor 1524 and/or the application processor 1506, may include means for removing, correcting, or de-weighting at least one of the first measurement or the second measurement if the comparison indicates that the calculated DoA of the at least one RF signal is not identical to or not within a threshold range of the expected DoA of the at least one RF signal. In one configuration, the apparatus 1504, and in particular the cellular baseband processor 1524 and/or the application processor 1506, may include means for calculating a range difference associated with the at least one RF signal between the first time instance and the second time instance, and where calculating the DoA of the at least one RF signal is further based on the range difference. The means may be the virtual multiantenna component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
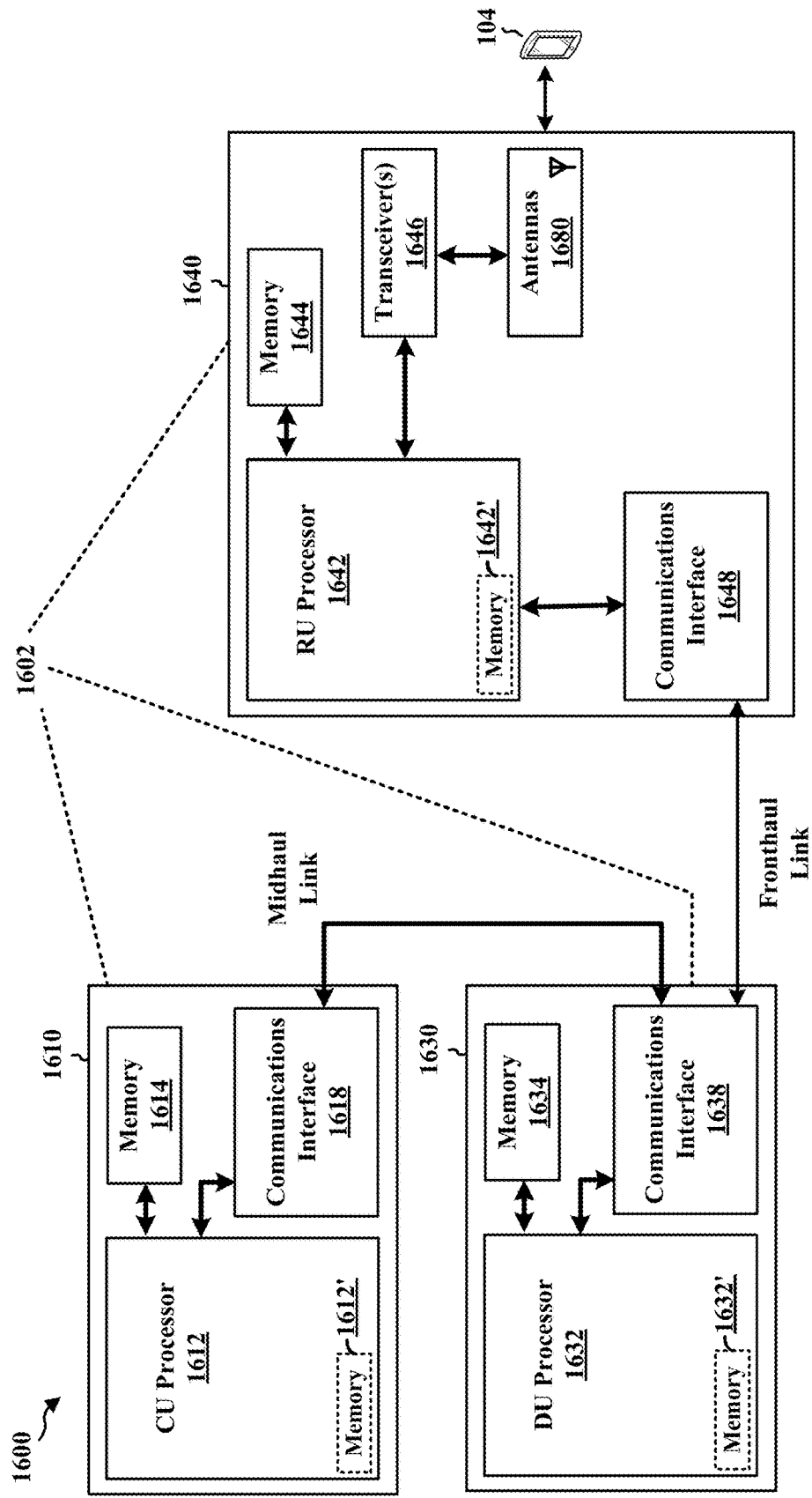
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. The network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s)

causes the processor(s) to perform the various functions described supra. The computer-readable medium/memory may also be used for storing data that is manipulated by the processor(s) when executing software.

A wireless communication device equipped with multiple antennas may utilize the multiple antennas in order to determine a DoA of a signal. The DoA may then be utilized to improve GNSS PNT performance. For instance, the DoA may be utilized to remove multipath and NLOS signals and/or the DoA may be utilized for anti-spoofing purposes to mitigate signals from unexpected directions. However, some wireless communication devices may not be equipped with multiple antennas.

Various technologies pertaining to a virtual multi-antenna for enhanced RF-based PNT are described herein. In an example, a UE obtains, via an antenna of the UE, a first indication of a first measurement of at least one RF signal at a first time instance. The UE obtains, via the antenna, a second indication of a second measurement of the at least one RF signal at a second time instance. The UE calculates a distance traveled by the UE between the first time instance and the second time instance. The UE calculates a DoA of the at least one RF signal based on the first measurement, the second measurement, and the distance traveled by the UE between the first time instance and the second time instance. The UE outputs a third indication of the calculated DoA of the at least one RF signal. Vis-à-vis calculating the DoA of the at least one RF signal using the antenna (e.g., a single omni-directional antenna), the UE may emulate functionality associated with multiple antennas. For instance, the UE may utilize the DoA (calculated based on measurements performed via the antenna) in order to remove multipath and NLOS signals and/or utilize the DoA for anti-spoofing purposes to mitigate signals from unexpected directions without being equipped with multiple antennas.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: obtaining, via an antenna of the UE, a first indication of a first measurement of at least one radio frequency (RF) signal at a first time instance; obtaining, via the antenna, a second indication of a second measurement of the at least one RF signal at a second time instance; calculating a distance traveled by the UE between the first time instance and the second time instance; calculating a direction of arrival (DoA) of the at least one RF signal based on the first measurement, the second measurement, and the distance traveled by the UE between the first time instance and the second time instance; and outputting a third indication of the calculated DoA of the at least one RF signal.

Aspect 2 is the method of aspect 1, further including: performing a comparison of the calculated DoA of the at least one RF signal with an expected DoA of the at least one RF signal.

Aspect 3 is the method of aspect 2, where the comparison is associated with at least one of a line of sight (LoS) of the at least one RF signal, a non-LOS (NLOS) of the at least one RF signal, a multiple-path (multi-path) of the at least one RF signal, or a spoofing signal of an unexpected DoA of the at least one RF signal.

Aspect 4 is the method of any of aspects 2-3, where the expected DoA of the at least one RF signal is based on at least one of data from an almanac, satellite ephemeris data, or communication data received from a network.

Aspect 5 is the method of any of aspects 2-4, further including: utilizing the calculated DoA of the at least one RF signal for at least one of position purposes, navigation purposes, or timing purposes if the comparison indicates that the calculated DoA of the at least one RF signal is identical to or within a threshold range of the expected DoA of the at least one RF signal.

Aspect 6 is the method of any of aspects 2-4, further including: removing, correcting, or de-weighting at least one of the first measurement or the second measurement if the comparison indicates that the calculated DoA of the at least one RF signal is not identical to or not within a threshold range of the expected DoA of the at least one RF signal.

Aspect 7 is the method of any of aspects 1-6, where the antenna of the UE is a single omnidirectional antenna.

Aspect 8 is the method of any of aspects 1-7, where calculating the distance travelled by the UE includes performing a dead-reckoning procedure for the UE.

Aspect 9 is the method of any of aspects 1-8, where calculating the distance travelled by the UE is based on one or more outputs of an inertial measurement unit (IMU) of the UE.

Aspect 10 is the method of any of aspects 1-9, where a velocity of the UE is non-perpendicular to a line of sight (LOS) of the at least one RF signal between the first time instance and the second time instance.

Aspect 11 is the method of any of aspects 1-10, where the at least one RF signal is associated with at least one of a terrestrial network node, a space vehicle (SV), a global navigation satellite system (GNSS), or a low earth orbit (LEO) satellite.

Aspect 12 is the method of aspect 11, where the at least one RF signal is associated with at least one of the SV, the GNSS, or the LEO satellite, and where calculating the DoA of the at least one RF signal is further based on a velocity of at least one of the SV, the GNSS, or the LEO satellite and a difference between the second time instance and the first time instance.

Aspect 13 is the method of aspect 11, where the at least one RF signal is associated with the terrestrial network node, and where the distance traveled by the UE between the first time instance and the second time instance is less than a threshold distance.

Aspect 14 is the method of any of aspects 1-13, further including: calculating a range difference associated with the at least one RF signal between the first time instance and the second time instance, and where calculating the DoA of the at least one RF signal is further based on the range difference.

Aspect 15 is the method of any of aspects 1-14, where the DoA corresponds to a first elevation if the at least one RF signal is associated with a satellite, and where the DOA corresponds to a second elevation or an azimuth if the at least one RF signal is associated with a terrestrial network node.

Aspect 16 is the method of any of aspects 1-15, where outputting the third indication of the calculated DoA of the at least one RF signal includes transmitting, via at least one of the antenna or the transceiver, the third indication of the calculated DoA of the at least one RF signal.

Aspect 17 is the method of any of aspects 1-15, where outputting the third indication of the calculated DoA of the at least one RF signal includes storing, in a memory or a cache, the third indication of the calculated DoA of the at least one RF signal.

Aspect 18 is the method of any of aspects 1-17, where obtaining the first indication of the first measurement of the at least one RF signal at the first time instance includes performing, via the antenna of the UE, the first measurement of the at least one RF signal at the first time instance; and where obtaining the second indication of the second measurement of the at least one RF signal at the second time instance includes performing, via the antenna of the UE, the second measurement of the at least one RF signal at the second time instance.

Aspect 19 is an apparatus for wireless communication at a user equipment (UE) including a memory and at least one processor coupled to the memory and based at least in part on information stored in the memory, the at least one processor is configured to perform a method in accordance with any of aspects 1-18.

Aspect 20 is an apparatus for wireless communications, including means for performing a method in accordance with any of aspects 1-18.

Aspect 21 is the apparatus of aspect 19 or 20 further including at least one of the antenna or a transceiver coupled to the at least one processor, where to obtain the third indication of the calculated DoA of the at least one RF signal, the at least one processor is configured to transmit, via at least one of the antenna or the transceiver, the third indication of the calculated DoA of the at least one RF signal.

Aspect 22 is a computer-readable medium (e.g., a non-transitory computer-readable medium) including instructions that, when executed by an apparatus, cause the apparatus to perform a method in accordance with any of aspects 1-18.

What is claimed is:

1. An apparatus for wireless communication at a user equipment (UE), comprising:
   memory; and
   at least one processor coupled to the memory and, based at least in part on information stored in the memory, the at least one processor is configured to:
   obtain, via an antenna of the UE, a first indication of a first measurement of at least one radio frequency (RF) signal at a firsttime instance indicative of a first distance between the UE and a transmitter corresponding to the at least one RF signal;
   obtain, via the antenna, a second indication of a second measurement of the at least one RF signal at a second time instance indicative of a second distance between the UE and the transmitter;
   calculate a distance traveled by the UE between the first time instance and the second time instance based on the first distance and the second distance;
   calculate a direction of arrival (DoA) of the at least one RF signal based on the first measurement, the second measurement, and the distance traveled by the UE between the first time instance and the second time instance;
   output a third indication of the calculated DoA of the at least one RF signal; and
   perform at least one of a position operation, a navigation operation, or a timing operation based on the calculated DoA.

2. The apparatus of claim 1, wherein to perform at least one of the position operation, the navigation operation, or the timing operation based on the calculated DoA, the at least one processor is configured to:
perform a comparison of the calculated DoA of the at least one RF signal with an expected DoA of the at least one RF signal.

3. The apparatus of claim 2, wherein the comparison is associated with at least one of a line of sight (LoS) of the at least one RF signal, a non-LOS (NLOS) of the at least one RF signal, a multiple-path (multi-path) of the at least one RF signal, or a spoofing signal of an unexpected DoA of the at least one RF signal.

4. The apparatus of claim 2, wherein the expected DoA of the at least one RF signal is based on at least one of data from an almanac, satellite ephemeris data, or communication data received from a network.

5. The apparatus of claim 2, wherein to perform at least one of the position operation, the navigation operation, or the timing operation based on the calculated DoA, the at least one processor is configured to:
utilize the calculated DoA of the at least one RF signal for at least one of position purposes, navigation purposes, or timing purposes if the comparison indicates that the calculated DoA of the at least one RF signal is identical to or within a threshold range of the expected DoA of the at least one RF signal.

6. The apparatus of claim 2, wherein to perform at least one of the position operation, the navigation operation, or the timing operation based on the calculated DoA, the at least one processor is configured to:
remove, correct, or de-weight at least one of the first measurement or the second measurement if the comparison indicates that the calculated DoA of the at least one RF signal is not identical to or not within a threshold range of the expected DoA of the at least one RF signal.

7. The apparatus of claim 1, wherein the antenna of the UE is a single omnidirectional antenna.

8. The apparatus of claim 1, wherein to calculate the distance travelled by the UE, the at least one processor is configured to perform a dead-reckoning procedure for the UE.

9. The apparatus of claim 1, wherein to calculate the distance travelled by the UE, the at least one processor is configured to calculate the distance travelled by the UE based on one or more outputs of an inertial measurement unit (IMU) of the UE.

10. The apparatus of claim 1, wherein a velocity of the UE is non-perpendicular to a line of sight (LOS) of the at least one RF signal between the first time instance and the second time instance.

11. The apparatus of claim 1, wherein the at least one RF signal is associated with at least one of a terrestrial network node, a space vehicle (SV), a global navigation satellite system (GNSS), or a low earth orbit (LEO) satellite.

12. The apparatus of claim 11, wherein the at least one RF signal is associated with at least one of the SV, the GNSS, or the LEO satellite, and wherein to calculate the DoA of the at least one RF signal, the at least one processor is configured to calculate the DoA further based on a velocity of at least one of the SV, the GNSS, or the LEO satellite and a difference between the second time instance and the first time instance.

13. The apparatus of claim 11, wherein the at least one RF signal is associated with the terrestrial network node, and wherein the distance traveled by the UE between the first time instance and the second time instance is less than a threshold distance.

14. The apparatus of claim 1, wherein the at least one processor is further configured to:
calculate a distance difference associated with the at least one RF signal between the first time instance and the second time instance, and wherein to calculate the DoA of the at least one RF signal, the at least one processor is configured to calculate the DoA further based on the distance difference.

15. The apparatus of claim 1, wherein the DoA corresponds to a first elevation if the at least one RF signal is associated with a satellite, and wherein the DOA corresponds to a second elevation or an azimuth if the at least one RF signal is associated with a terrestrial network node.

16. The apparatus of claim 1, further comprising at least one of the antenna or a transceiver coupled to the at least one processor, wherein to output the third indication of the calculated DoA of the at least one RF signal, the at least one processor is configured to transmit, via at least one of the antenna or the transceiver, the third indication of the calculated DoA of the at least one RF signal.

17. The apparatus of claim 1, wherein to output the third indication of the calculated DoA of the at least one RF signal, the at least one processor is configured to store, in the memory or a cache, the third indication of the calculated DoA of the at least one RF signal.

18. The apparatus of claim 1, wherein to obtain the first indication of the first measurement of the at least one RF signal at the first time instance, the at least one processor is configured to perform, via the antenna of the UE, the first measurement of the at least one RF signal at the first time instance, and wherein to obtain the second indication of the second measurement of the at least one RF signal at the second time instance, the at least one processor is configured to perform, via the antenna of the UE, the second measurement of the at least one RF signal at the second time instance.

19. A method of wireless communication at a user equipment (UE), comprising:
obtaining, via an antenna of the UE, a first indication of a first measurement of at least one radio frequency (RF) signal at a first time instance indicative of a first distance between the UE and a transmitter corresponding to the at least one RF signal;
obtaining, via the antenna, a second indication of a second measurement of the at least one RF signal at a second time instance indicative of a second distance between the UE and the transmitter;
calculating a distance traveled by the UE between the first time instance and the second time instance based on the first distance and the second distance;
calculating a direction of arrival (DoA) of the at least one RF signal based on the first measurement, the second measurement, and the distance traveled by the UE between the first time instance and the second time instance;
outputting a third indication of the calculated DoA of the at least one RF signal; and
performing at least one of a position operation, a navigation operation, or a timing operation based on the calculated DoA.

20. The method of claim 19, further comprising:
performing a comparison of the calculated DoA of the at least one RF signal with an expected DoA of the at least one RF signal.

21. The method of claim 20, wherein the comparison is associated with at least one of a line of sight (LoS) of the at least one RF signal, a non-LOS (NLOS) of the at least one RF signal, a multiple-path (multi-path) of the at least one RF signal, or a spoofing signal of an unexpected DoA of the at least one RF signal.

22. The method of claim 20, wherein the expected DoA of the at least one RF signal is based on at least one of data from an almanac, satellite ephemeris data, or communication data received from a network.

23. The method of claim 20, further comprising:
utilizing the calculated DoA of the at least one RF signal for at least one of position purposes, navigation purposes, or timing purposes if the comparison indicates that the calculated DoA of the at least one RF signal is identical to or within a threshold range of the expected DoA of the at least one RF signal.

24. The method of claim 20, further comprising:
removing, correcting, or de-weighting at least one of the first measurement or the second measurement if the comparison indicates that the calculated DoA of the at least one RF signal is not identical to or not within a threshold range of the expected DoA of the at least one RF signal.

25. The method of claim 19, further comprising:
calculating a distance difference associated with the at least one RF signal between the first time instance and the second time instance, and wherein calculating the DoA of the at least one RF signal comprises calculating the DoA further based on the distance difference.

26. The method of claim 19, wherein the DoA corresponds to a first elevation if the at least one RF signal is associated with a satellite, and wherein the DOA corresponds to a second elevation or an azimuth if the at least one RF signal is associated with a terrestrial network node.

27. The method of claim 19, wherein the at least one RF signal is associated with at least one of a terrestrial network node, a space vehicle (SV), a global navigation satellite system (GNSS), or a low earth orbit (LEO) satellite.

28. The method of claim 27, wherein the at least one RF signal is associated with at least one of the SV, the GNSS, or the LEO satellite, and wherein calculating the DoA of the at least one RF signal is further based on a velocity of at least one of the SV, the GNSS, or the LEO satellite and a difference between the second time instance and the first time instance.

29. An apparatus for wireless communication at a user equipment (UE), comprising:
means for obtaining, via an antenna of the UE, a first indication of a first measurement of at least one radio frequency (RF) signal at a first time instance indicative of a first distance between the UE and a transmitter corresponding to the at least one RF signal;
means for obtaining, via the antenna, a second indication of a second measurement of the at least one RF signal at a second time instance indicative of a second distance between the UE and the transmitter;
means for calculating a distance traveled by the UE between the first time instance and the second time instance based on the first distance and the second distance;
means for calculating a direction of arrival (DoA) of the at least one RF signal based on the first measurement, the second measurement, and the distance traveled by the UE between the first time instance and the second time instance;
means for outputting a third indication of the calculated DoA of the at least one RF signal; and
means for performing at least one of a position operation, a navigation operation, or a timing operation based on the calculated DoA.

30. A non-transitory computer-readable medium storing computer executable code at a user equipment (UE), the computer executable code when executed by at least one processor causes the at least one processor to:
obtain, via an antenna of the UE, a first indication of a first measurement of at least one radio frequency (RF) signal at a first time instance indicative of a first distance between the UE and a transmitter corresponding to the at least one RF signal;
obtain, via the antenna, a second indication of a second measurement of the at least one RF signal at a second time instance indicative of a second distance between the UE and the transmitter;
calculate a distance traveled by the UE between the first time instance and the second time instance based on the first distance and the second distance;
calculate a direction of arrival (DoA) of the at least one RF signal based on the first measurement, the second measurement, and the distance traveled by the UE between the first time instance and the second time instance;
output a third indication of the calculated DoA of the at least one RF signal, and
perform at least one of a position operation, a navigation operation, or a timing operation based on the calculated DoA.

* * * * *